(12) United States Patent  
Tsuchino et al.

(10) Patent No.: US 7,846,525 B2  
(45) Date of Patent: Dec. 7, 2010

(54) INFORMATION RECORDING MEDIUM AND METHOD OF MANUFACTURING THE SAME

(75) Inventors: Akio Tsuchino, Osaka (JP); Takashi Nishihara, Osaka (JP); Rie Kojima, Osaka (JP)

(73) Assignee: Panasonic Corporation, Osaka (JP)

( * ) Notice: Subject to any disclaimer, the term of this patent is extended or adjusted under 35 U.S.C. 154(b) by 789 days.

(21) Appl. No.: 11/659,122

(22) PCT Filed: Apr. 20, 2006

(86) PCT No.: PCT/JP2006/308326

§ 371 (c)(1),  
(2), (4) Date: Feb. 1, 2007

(87) PCT Pub. No.: WO2006/134721

PCT Pub. Date: Dec. 21, 2006

(65) Prior Publication Data

US 2009/0003174 A1    Jan. 1, 2009

(30) Foreign Application Priority Data

Jun. 15, 2005    (JP)    .............................. 2005-174580

(51) Int. Cl.  
*B32B 3/02*    (2006.01)

(52) U.S. Cl. ................ 428/64.1; 428/64.4; 428/64.5; 428/64.6; 430/270.13

(58) Field of Classification Search ........................ None  
See application file for complete search history.

(56) References Cited

U.S. PATENT DOCUMENTS

| | | | |
|---|---|---|---|
| 6,456,584 B1 | 9/2002 | Nagata et al. | |
| 6,821,707 B2 | 11/2004 | Uno et al. | |
| 6,890,613 B2 | 5/2005 | Nishihara et al. | |
| 2001/0041304 A1 | 11/2001 | Uno et al. | |
| 2002/0168587 A1* | 11/2002 | Sakaue et al. | 430/270.13 |
| 2003/0064211 A1* | 4/2003 | Hirotsune et al. | 428/209 |
| 2004/0033442 A1 | 2/2004 | Nishihara et al. | |
| 2004/0042381 A1* | 3/2004 | Miyamoto et al. | 369/275.4 |
| 2005/0019695 A1* | 1/2005 | Kojima et al. | 430/270.13 |
| 2005/0074694 A1* | 4/2005 | Nishihara et al. | 430/270.13 |

FOREIGN PATENT DOCUMENTS

| | | |
|---|---|---|
| JP | 3-125343 | 5/1991 |
| JP | 2790874 | 5/1991 |
| JP | 10-275360 | 10/1998 |
| JP | 3612927 | 10/1998 |
| JP | 2000-36130 | 2/2000 |
| JP | 2002-144736 | 5/2002 |

* cited by examiner

*Primary Examiner*—Elizabeth Mulvaney  
(74) *Attorney, Agent, or Firm*—Wenderoth, Lind & Ponack, L.L.P.

(57) ABSTRACT

An information recording medium with high recording sensitivity, superior repeat overwriting capability and favorable signal storage stability during information recording is offered. For this purpose, an information recording medium comprises one or more information layers that include a phase-change recording layer, wherein at least one of the information layers includes, a Cr-containing layer containing Cr and O that contact with one side of a surface of the recording layer, and an In-containing layer containing In and O that contact with the other side of the surface of the recording layer.

23 Claims, 10 Drawing Sheets

FIG.11
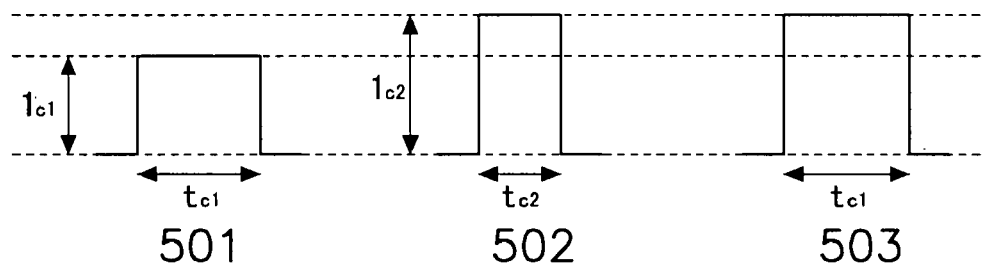
501  502  503
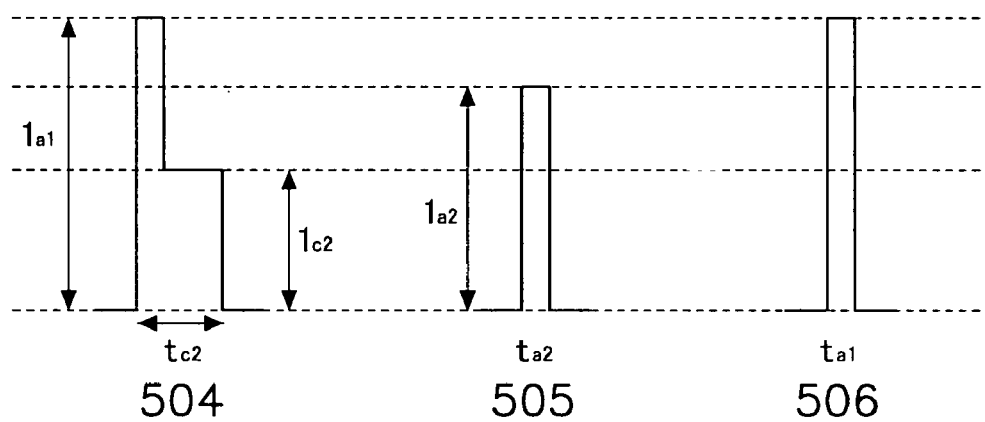
504  505  506
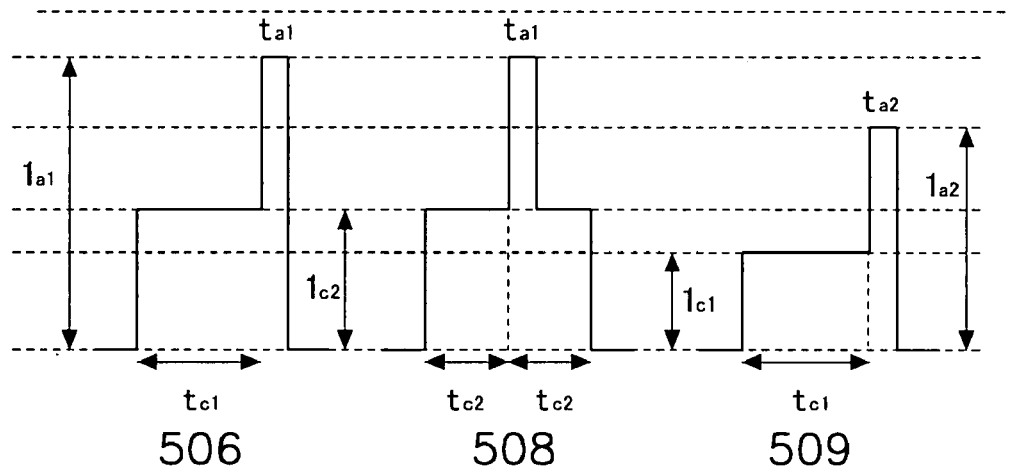
506  508  509

INFORMATION RECORDING MEDIUM AND METHOD OF MANUFACTURING THE SAME

BACKGROUND OF THE INVENTION

I. Technical Field

The present invention relates to an information recording medium wherein information is recorded, erased, overwritten and/or reproduced optically or electronically, and a method of manufacturing the same.

II. Description of Related Art

In conventional information recording media, a phase-change information recording medium that utilizes a phase-change phenomenon in a recording layer (phase-change material layer) is produced. Among these phase-change information recording media, one in which information is recorded, erased, overwritten and/or reproduced optically by using a laser beam is an optical phase-change information recording medium. In an optical phase-change information recording medium, a change of state of the recording layer is produced as a result of heat generated by irradiation with a laser beam, and the difference in reflectance is detected and is read out as information. Among optical phase-change information recording media, in a overwritable optical phase-change information recording medium in which information can be erased and overwritten, the initial state of the recording layer is generally a crystalline phase, and when information is recorded, the recording layer is melted by irradiating with a high power (recording power) laser beam and then is rapidly cooled, and thus the laser-irradiated portion becomes amorphous. On the contrary, when information is erased, the recording layer is warmed by irradiating with a laser beam which has a lower power than the power used for the recording and then is cooled, and thus the laser-irradiated portion becomes crystalline. Consequently, in a rewritable optical phase-change information recording medium, by irradiating the recording layer with a laser beam for which the power is modulated between a high power level and a low power level, it is possible for new information to be recorded or overwritten while recorded information is being erased. Moreover, among optical phase-change information recording media, for write-once optical phase-change information recording media in which it is possible for information to be recorded one time but not possible for information to be erased or overwritten, the initial state of the recording layer is generally an amorphous phase, and the laser-irradiated portion becomes crystalline as the recording layer warms up and cools while being irradiated with a high power (recording power) laser beam when information is recorded.

Instead of the abovementioned irradiation with a laser beam, there are also electrical phase-change information recording media that record information by causing a state change in the phase-change material of the recording layer by means of Joule heating generated by the application of electrical energy (for example electrical current). In these electrical phase-change information recording media, the phase-change material of the recording layer undergoes a state change between a crystalline phase (low resistance) and an amorphous phase (high resistance) by means of Joule heating generated by the application of electrical current, and the difference in electrical resistance between the crystalline phase and amorphous phase is detected and is reproduced as information.

The commercial 4.7 GB/DVD-RAM is given as an example of an optical phase-change information recording medium. As shown in FIG. 12 for information recording medium 12, the 4.7 GB/DVD-RAM has a 7-layer configuration, where first dielectric layer 2, first interface layer 3, recording layer 4, second interface layer 5, second dielectric layer 6, light absorption correction layer 7, and reflection layer 8 are provided over substrate 1 in this order from the laser incident side.

First dielectric layer 2 and second dielectric layer 6 adjust the optical path and enhance the light absorption efficiency of recording layer 4, so that optical action increases the signal intensity as the change in reflectance between the crystalline phase and the amorphous phase grows larger, and serve a thermal function to insulate the heat-sensitive substrate 1 and dummy substrate 10 and so forth from the heat due to the higher temperature of recording layer 4 during recording. As a dielectric material, for example, conventionally used $(ZnS)_{80}(SiO_2)_{20}$ (mol %) is a superior dielectric material that has transparency and a high refractive index, and is also a good insulator with low thermal conductivity, favorable mechanical characteristics and resistance to humidity. Furthermore, the thicknesses of first dielectric layer 2 and second dielectric layer 6 is determined exactly according to a calculation based on the matrix method, so as to satisfy conditions that increase the change in the amount of reflected light between the crystalline phase and amorphous phase of recording layer 4, and increase the light absorption in recording layer 4.

By using a high crystallization speed material in recording layer 4 that includes Ge—Sn—Sb—Te wherein Sn substitutes for a portion of the Ge in the pseudo-binary phase-change material GeTe—$Sb_2Te_3$ that combines the compounds GeTe and $Sb_2Te_3$, not only is there efficient overwriting of the initial recording, but superior recording storage stability (the indicator of whether the recorded signal can be recovered after long-term storage) and overwriting storage stability (the indicator of whether the recorded signal can be erased or overwritten after long-term storage) are also realized.

First interface layer 3 and second interface layer 5 function to prevent mass transfer from taking place between first dielectric layer 2 and recording layer 4, and between second dielectric layer 6 and recording layer 4. In this mass transfer phenomenon, when (ZnS)80(SiO2)20 (mol %) is used in first dielectric layer 2 and second dielectric layer 6, S (sulfur) diffuses into the recording layer during the time when recording layer 4 is irradiated with a laser beam for repeated recording and overwriting. When S diffuses into the recording layer, the repeat overwriting capability deteriorates. The use of Ge-containing nitrides in first interface layer 3 and second interface layer 5 favors the avoidance of this deterioration of the repeat overwriting capability (for example, see Japanese published unexamined patent application No. H10-275360 (pp. 2-6, FIG. 2)).

Through the use of technology such as that described above, superior overwriting performance and high reliability were achieved and the 4.7 GB/D VD-RAM was brought to commercialization.

Moreover, various kinds of technology have been studied in order to obtain information recording media with higher capacity. In the example of optical phase-change information recording media, a high density recording technique with a smaller laser beam spot diameter was investigated by using a violet-blue laser with a shorter wavelength than that of the conventional red laser, and by using a thinner substrate on the laser beam-incident side and an objective lens with a larger numerical aperture (NA). When recording is carried out with a smaller spot diameter, since the time irradiating laser beam with the recording layer become relatively short, the recording layer needs to be made up of materials which has high crystallization ability or to be contact with an interface layer which has high crystallization promoting effect so that short time crystallization is available.

In addition, the information capacity increases two-fold by using an optical phase-change information recording medium that is provided with two information layers (referred to below as a bilayer optical phase-change information recording medium), and the technique of carrying out recording and reproducing operations on the two information layers by using an incident laser beam from one side has also been investigated (for example see Japanese published unexamined patent application No. 2000-36130 (pp. 2-11, FIG. 2); and Japanese published unexamined patent application No. 2002-144736 (pp. 2-14, FIG. 3)). In these bilayer optical phase-change information recording media, laser beam that is used will pass through the information layer proximal to the laser beam incident side (referred to as the first information layer) in order to perform recording and reproducing operations on the information layer distal to the laser beam incident side (referred to below as the second information layer), so the first information layer should have an extremely thin film thickness and high transparency. However, as the recording layer becomes thinner, crystal nuclei formed during the crystallization of the recording layer decrease and a distance of atom transfer becomes shorter. Thus, as the recording layer becomes thinner, the harder will be forming the crystal phase (i.e. the crystallization speed becomes low). For the above reasons, in the first information layer where the recording layer is thin, the recording layer needs to be made up of materials which has high crystallization ability or to be contact with an interface layer which has high crystallization promoting effect.

In addition, when the transfer rate of information becomes high by shortening the recording time of the information of the information recording medium, the crystallization time becomes short. Thus, to realize phase-change information recording media which support high transfer rates, the recording layer here also needs to be made up of materials which has high crystallization ability or to be contact with an interface layer which has high crystallization promoting effect.

Heretofore, inventors have introduced materials which have high crystallization ability for the recording layer, and have introduced Ge-containing nitrides in interface layers arranged on both sides of the information layer in substantially the same manner as with the 4.7 GB/DVD-RAM.

However, in a case that the materials which have high crystallization ability for the recording layer is used to improve the crystallization speed of an optical phase-change information recording medium, forming the amorphous state will be hard particularly for a overwritable optical phase-change information recording medium. Thus, the recording layer must be heated to a high temperature to broaden a melting area and then must be rapidly cooled. This requires higher energy (laser power) for the information recording. Then, when the conventional Ge-containing nitrides are used for the interface layers, heat generated in the recording layer destroys the interface layer and the repeat overwriting capability rapidly deteriorates.

Moreover, since Ge-containing nitrides have high thermal conductivity, if a thicker interface layer is constructed, the heat will facilitate the diffusion. As a result, there is a problem with reduced recording sensitivity.

In addition, to improve the repeat overwriting capability, when an interface layer containing Cr and O, not the abovementioned Ge-containing nitrides, is introduced, the repeat overwriting capability improves but the signal storage stability of recording marks deteriorates. Even this interface layer containing Cr and O is used, there is a problem with reduced recording sensitivity.

SUMMARY OF THE INVENTION

The present invention is to solve the abovementioned conventional problems, and the object is to provide a phase-change information recording medium of which a crystallization speed is improved without reducing the repeat overwriting capability, the recording sensitivity and the signal storage stability.

In order to solve the above problems, the present invention provides an information recording medium comprising one or more information layers including a phase-change recording layer, wherein at least one of the information layers includes a Cr-containing layer containing Cr and O that contact with one side of a surface of the recording layer, and an In-containing layer containing In and O that contact with the other side of the surface of the recording layer.

In addition, the present invention provides a method for manufacturing an information recording medium comprising a phase-change recording layer, comprising, forming an interface layer using an In-containing sputtering target that includes In and O, forming the recording layer; and forming an interface layer using a Cr-containing sputtering target that includes Cr and O.

According to the information recording media of the present invention, the crystallization speed can be improved without decreasing the repeat overwriting capability, the recording sensitivity, and signal storage stability. In addition, according to the method of manufacturing the information recording media of the present invention, the phase-change information recording media of the present invention can easily be manufactured.

BRIEF DESCRIPTION OF THE DRAWINGS

FIG. 11 is a diagram showing an example of recording/erasing pulse waveforms of the electrical information recording medium of the present invention.

DETAILED DESCRIPTION OF THE INVENTION

Hereinafter, embodiments of the invention are explained with reference to the diagrams. Furthermore, while examples of embodiments are given below, the present invention is not limited to these embodiments. Moreover, in the embodiments given below, where there are multiple occurrences of same component identified by the same symbol, that component will be omitted from the explanation.

Embodiment 1

Figure 1:
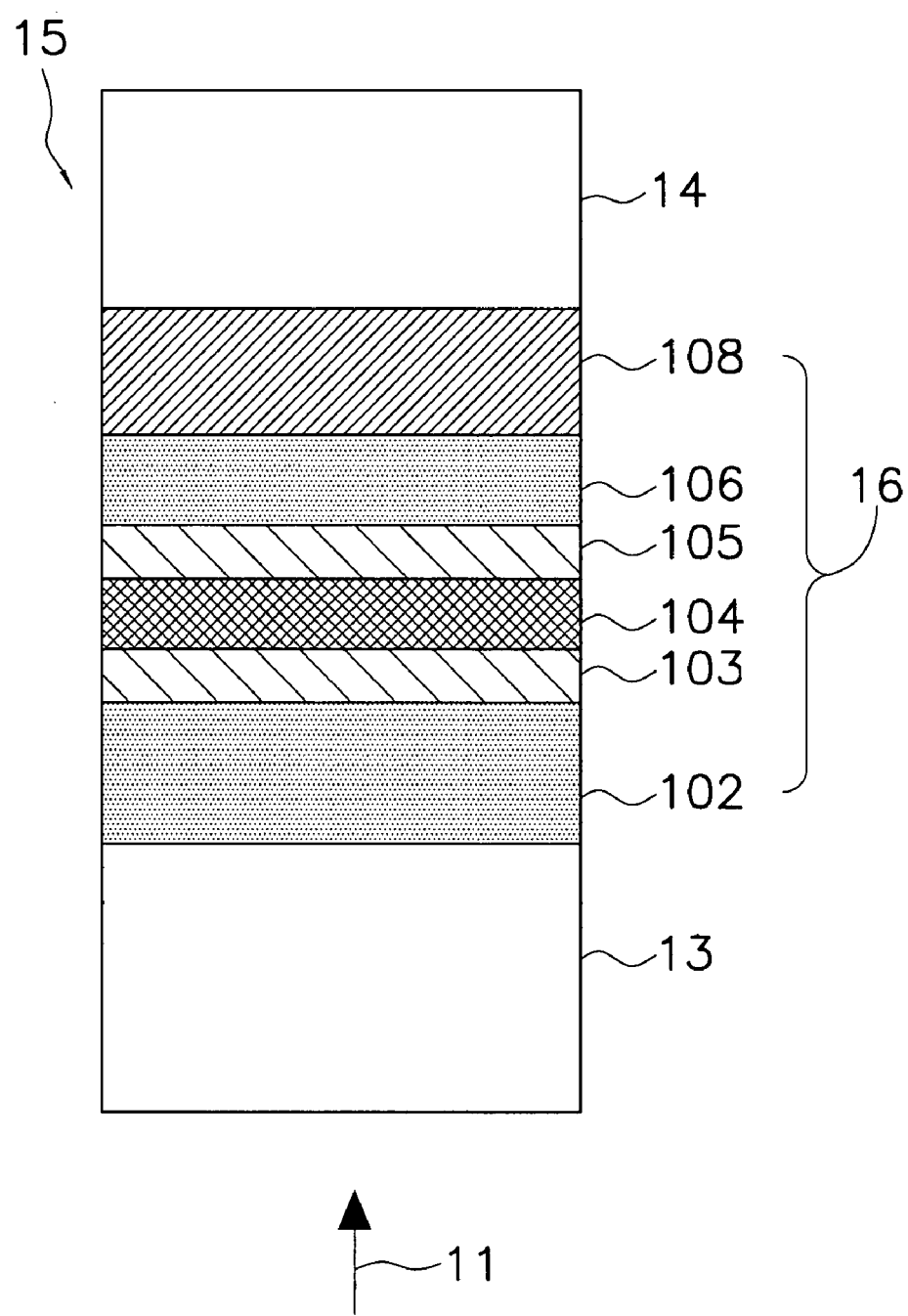
FIG. 1 is a cross-sectional diagram showing an example of a layer structure on an information recording medium comprising one information layer of the present invention.

An example of an information recording medium of the present invention is explained in Embodiment 1. A partial cross-sectional diagram of information recording medium 15 of Embodiment 1 is shown in FIG. 1. Information recording medium 15 is an optical information recording medium wherein it is possible to record and/or reproduce information by irradiating with laser beam 11.

Information recording medium 15 is constituted from information layer 16 and transparent layer 13 formed on substrate 14.

The material of transparent layer 13 is constituted from a resin such as a photocurable resin (particularly an ultra violet radiation-curable resin), a slow-acting resin and the like, or a dielectric and the like, preferably with low light absorption with respect to laser beam 11 being used, preferably with low optical birefringence in the short-wavelength region. In addition, a transparent disk of a resin such as polycarbonate, amorphous polyolefin, PMMA and the like, or glass can be used for transparent layer 13. In this case, it is possible for transparent layer 13 to be bonded to first dielectric layer 102 by using a resin such as a photocurable resin (particularly an ultra violet radiation-curable resin) or a slow-acting resin and the like.

Since the spot diameter when laser beam 11 is focused is determined by the wavelength λ (the shorter the wavelength λ, the smaller will be the spot diameter achievable by focusing), for high density information recording, the wavelength λ of laser beam 11 is preferably a wavelength of ≦450 nm in particular. Moreover, since the light absorption in transparent layer 13 and the like becomes larger below 350 nm, a wavelength within the range of 350 nm to 450 nm is more preferred.

Substrate 14 is a transparent, disk-shaped substrate. Depending on the requirements, a guide groove (track pitch of 0.32 μm) for guiding the laser beam can be formed in the surface of the information layer 16 side of substrate 14. On the other hand, it is preferable for a surface of substrate 14, which is the opposite side of the information layer 16 side, to be smooth.

For the material of substrate 14, for example, a resin such as polycarbonate, amorphous polyolefin, PMMA and the like, or glass and the like can be used. Polycarbonate is particularly useful from the perspective of superior transcribability and mass producibility, and low cost.

Furthermore, from the perspective of having sufficient strength and for the thickness of information recording medium 15 to be on the order of 1.2 mm, a thickness for substrate 14 in the range of 0.5 mm to 1.2 mm is preferred. In addition, when the thickness of transparent layer 13 is on the order of 0.6 mm (the thickness for favorable recording and reproducing operations are possible with NA=0.6), a thickness for information recording medium 15 within the range of 5.5 mm to 6.5 mm is preferred. Moreover, when the thickness of transparent layer 13 is on the order of 0.1 mm (the thickness for favorable recording and reproducing operations are possible with NA=0.85), a thickness for information recording medium 15 within the range of 1.05 mm to 1.15 mm is preferred.

The structure of information layer 16 is explained in detail below.

Arranged in order from the laser beam 11 incident side, information layer 16 comprises first dielectric layer 102, first interface layer 103, recording layer 104, second interface layer 105, second dielectric layer 106 and reflective layer 108.

First dielectric layer 102 is made from a dielectric. First dielectric layer 102 acts to prevent recording layer 104 from undergoing oxidation, corrosion, deformation and the like, acts to adjust the optical path and enhance the light absorption efficiency of recording layer 104, and acts to increase the signal intensity by increasing the change in the amount of reflected light between before and after recording.

For the material of first dielectric layer 102, for example, oxides such as $TiO_2$, $ZrO_2$, $HfO_2$, $ZnO$, $Nb_2O_5$, $Ta_2O_5$, $SiO_2$, $SnO_2$, $Al_2O_3$, $Bi_2O_3$, $Cr_2O_3$, $Ga_2O_3$, $In_2O_3$, $Y_2O_3$, $Dy_2O_3$ and the like can be used. In addition, nitrides such as C—N, Ti—N, Zr—N, Nb—N, Ta—N, Si—N, Ge—N, Cr—N, Al—N, Ge—Si—N, Ge—Cr—N and the like can also be used. Moreover, sulfides such as ZnS and the like, carbides such as SiC and the like, fluorides such as $LaF_3$, $CeF_3$ and the like and C can also be used. In addition, mixtures of the above materials can also be used. For example, $ZnS—SiO_2$ that is a mixture of ZnS and $SiO_2$ is a particularly superior material for first dielectric layer 102. $ZnS—SiO_2$ is an amorphous material with high refractive index, rapid film deposition rate, favorable mechanical characteristics and resistance to humidity.

The thickness of first dielectric layer 102 is determined exactly according to a calculation based on the matrix method, so as to satisfy conditions that increase the change in the amount of reflected light between the crystalline phase and amorphous phase of recording layer 104. Here, the thickness of first dielectric layer 102 is desirable within the range of 10 nm to 150 nm, and is more desirable within the range of 30 nm to 80 nm.

First interface layer 103 acts to prevent the mass transfer that arises between first dielectric layer 102 and recording layer 104 due to repeated recording.

For the material of interface layer 103, in order to prevent first interface layer 103 from melting and mixing into recording layer 104 when irradiating with a high power laser beam 11, materials with less light absorption capability and high melting point so as not to melt during the information recording are preferred. This is because that if the material of first interface layer 103 is mixed, a composition of recording layer 104 changes and the overwriting capability particularly deteriorates. Moreover, since adhesiveness of first interface layer 103 and recording layer 104 is essential for ensuring reliability of information recording medium 15, the materials of good adhesiveness with recording layer 104 is preferred.

For specific materials of first interface layer 103, materials containing Cr and O are preferable since the crystallization of recording layer 104 is more improved. Among these, the oxide $Cr_2O_3$ formed from Cr and O, such as $Cr_2O_3$—$ZrO_2$, $Cr_2O_3$—$HfO_2$, $Cr_2O_3$—$Ga_2O_3$, $Cr_2O_3$—$In_2O_3$, $Cr_2O_3$—$Y_2O_3$, $Cr_2O_3$—$SiO_2$, $Cr_2O_3$—$ZrO_2$—$SiO_2$, $Cr_2O_3$—$Y_2O_3$—$SiO_2$ and the like, is preferable. Particularly, $Cr_2O_3$ is the material of good adhesiveness with recording layer 104. On the other hand, materials containing In and O can also be used. Particularly, it is preferable to contain $In_2O_3$ as an oxide. $In_2O_3$ is also the material of good adhesiveness with recording layer 104. Other than these materials, first interface layer 103 may also contain M1 (provided that M1 is at least one element selected from Zr, Hf, Ga, In, Y and Si) in addition to Cr and O, or M2 (provided that M2 is at least one element selected from Zr, Hf, Ga, Y, Dy and Si) in addition to In and O. As these oxides are mixed, information recording medium 15 with the superior repeat overwriting performance and high reliability is achieved even if first interface layer 103 partially contacts with recording layer 104. In order to ensure the adhesiveness with recording layer 104, a content of $Cr_2O_3$ in the oxide of $Cr_2O_3$ and M1 is preferably ≧10 mol %. Furthermore, a content of $In_2O_3$ in the oxide of $In_2O_3$-M2 is preferably ≧10 mol %. In addition, a content of $Cr_2O_3$ in the oxide of $Cr_2O_3$ and M1 is preferably ≦70 mol % in order to keep light absorption low at first interface layer 103 (if the content of $Cr_2O_3$ becomes high, the amount of light absorption tends to increase).

The thickness of first interface layer 103 is preferable within the range of 0.5 nm to 50 nm, and is more preferable within the range of 1 nm to 10 nm so as not to decrease the change in the amount of reflected light before and after the recording at the information layer 16 due to light absorption at first interface layer 103.

In the same manner as with first interface layer 103, second interface layer 105 acts to prevent any mass transfer that arises between second dielectric layer 106 and recording layer 104 due to repeated recording.

For specific materials of second interface layer 105, materials containing In and O are preferable. Among these, the oxide $In_2O_3$ formed from In and O, such as $In_2O_3$—$ZrO_2$, $In_2O_3$—$HfO_2$, $In_2O_3$—$Ga_2O_3$, $In_2O_3$—$Y_2O_3$, $In_2O_3$—$Dy_2O_3$, $In_2O_3$—$SiO_2$, $In_2O_3$—$ZrO_2$—$SiO_2$, $In_2O_3$—$Y_2O_3$—$SiO_2$, $In_2O_3$—$Dy_2O_3$—$SiO_2$, is preferable. On the other hand, materials containing Cr and O can also be used in second interface layer 105. In such the case, it is preferable to contain the oxide $Cr_2O_3$ formed from Cr and O. Moreover, in the same manner as with first interface layer 103, second interface layer 105 may also contain M1 in addition to Cr and O, or M2 in addition to In and O, Since there is a tendency for the adhesiveness of second interface layer 105 to be poorer than that of first interface layer 103, it is preferable that a content of $Cr_2O_3$ in the oxide of $Cr_2O_3$ and M1, or a content of $In_2O_3$ in the oxide of $In_2O_3$-M2 is of ≧20 mol %.

In the same manner as with first interface layer 103, the thickness of second interface layer 105 is preferably within the range of 0.5 nm to 15 nm, and is more preferably within the range of 1 nm to 10 nm.

The same series of materials as were used for first dielectric layer 102 can be used in second dielectric layer 106. Among these, $ZrO_2$, $HfO_2$, $Ga_2O_3$, $In_2O_3$, $Cr_2O_3$, $SiO_2$, $Dy_2O_3$, $LaF_3$, $CeF_3$, or dielectrics containing these materials as a mixed state (for example, $ZrO_2$—$Ga_2O_3$, $ZrO_2$—$In_2O_3$, $Dy_2O_3$—$In_2O_3$, $ZrO_2$—$In_2O_3$—$Cr_2O_3$, $ZrO_2$—$SiO_2$—$In_2O_3$, $ZrO_2$—$Cr_2O_3$—$LaF_3$, $HfO_2$—$Dy_2O_3$ and the like) are particularly superior materials for second dielectric layer 106. The thickness of second dielectric layer 106 is preferably within the range of 2 nm to 75 nm, and is more preferably within the range of 5 nm to 40 nm. Second dielectric layer 106 with the thickness of the range enables the heat generated at recording layer 104 to effectively diffuse toward the reflective layer 108 side.

Also, depending on the requirements, second dielectric layer 106 can be absent. In this case, the thicknesses of second interface layer 105 can be determined exactly according to a calculation based on the matrix method, so as to satisfy conditions that increase the change in the amount of reflected light between the crystalline phase and amorphous phase of recording layer 104. The thickness of second interface layer 105 is preferably within the range of 2 nm to 75 nm, and is more preferably within the range of 5 nm to 40 nm.

Recording layer 104 in constituted of a material that will undergo a reversible phase-change between a crystalline phase and an amorphous phase due to irradiation with laser beam 11. Recording layer 104 can be formed from a material that includes for example Ge, Te, and M3 (provided that M3 is at least one element selected from Sb and Bi). Specifically, recording layer 104 can be formed from a material represented by $Ge_aM3_bTe_{3+a}$. Here, recording layer 104 has a favorable recording storage stability with a low transfer rate in a stable amorphous phase, and a favorable overwriting storage stability with an elevated melting point and a high transfer rate with little reduction in the crystallization speed, where it is desirable to satisfy the relationship $0<a≦60$. It is more preferable to satisfy the relationship $4≦a≦40$. Moreover, for the amorphous phase to be stable and to have little reduction in the crystallization speed, satisfying the relationship $1.5≦b≦7$ is preferable, and it is more preferable to satisfy the relationship $2≦b≦4$.

Additionally, it is also favorable for recording layer 104 to be formed from a material represented by $(Ge-M4)_aM3_bTe_{3+a}$ (provided that M4 is at least one element selected from Sn, La and Pb). When this material is used, since the element M4 that substitutes for Ge will increase the crystallizability, it is possible to obtain satisfactory erase ratios even when the thickness of recording layer 104 is thin. For element M4, Sn is more preferable. When this material is used, it is preferable for $0<a≦60$ (with $4≦a≦40$ being more preferable), and $1.5≦b≦7$ (with $2≦b≦4$ being more preferable). Furthermore, it is also possible for recording layer 104 to be formed from another material represented by $Ge_a(M3-M5)_bTe_{3+a}$ (provided that M5 is at least one element selected from In, Ga and Al). For element M5, In is more preferable. For mixing concentration of element M5, it is more preferable to be ≦4% with respect to a gross composition of recording layer 104. When this material is used, it is preferable for $0<a≦60$ (with $4≦a≦40$ being more preferable), and $1.5≦b≦7$ (with $2≦b≦4$ being more preferable). Furthermore, it is also possible for recording layer 104 to be formed from a material represented by $(Ge-M4)_a(M3-M5)_bTe_{3+a}$. For element M4, Sn is more preferable, and for element M5, In is more preferable. For mixing concentration of element M5, it is more preferable to be ≦4% with respect to a gross composition of recording layer 104. When this material is used, it is preferable for $0<a≦60$ (with $4≦a≦40$ being more preferable), and $1.5≦b≦7$ (with $2≦b≦4$ being more preferable). In addition, recording layer 104 can be formed from a material that includes Sb and M6 (provided that M6 is at least one element selected from V, Mn, Ga, Ge, Se, Ag, In, Sn, Te, Pb, Bi and Au). Specifically, recording layer 104 can be formed from a material that is represented by $Sb_cM6_{100-c}$ (atom %). When c satisfies the relationship $50≦c≦95$, the reflectance difference between the crystalline state and the amorphous state of recording layer 104 of information recording medium 15 can become greater, and favorable recording and reproducing characteristics can be obtained.

Among these, when $75 \leq c \leq 95$, the crystallization speed is particularly rapid, and favorable overwriting capability with a high transfer rate can be obtained. In addition, when $50 \leq c \leq 75$, the amorphous state is particularly stable, and favorable recording capability with a low transfer rate can be obtained. For other materials, recording layer 104 can be formed from irreversible phase-change materials. For the irreversible phase-change materials, for example, as disclosed in Japanese patent publication No. H7-25209 (Patent No. 2006849), a material constituted from Te—O-M7 (provided that M7 is an element such as Pd, Ge and the like) is preferable. When the recording layer is formed from the irreversible phase-change materials, an information recording medium is a write-once type in which information can be recorded one time. For such the information recording medium, the present invention is preferably applied to improve the recording sensitivity and the signal storage stability.

The materials of recording layer 104 may be formed by magneto optical materials in which information is recorded, erased and/or reproduced by applying magnetic field and light. For those materials, at least one element selected from a group of rare-earth metals of Tb, Gd, Dy, Nd, and Sm, and at least one element selected from a group of transition metals of Sc, Cr, Fe, Co, and Ni can be used. Specifically, those materials are Tb—Fe, Te—Fe—Co, Gd—Fe, Gd—Fe—Co, Dy—Fe—Co, Nd—Fe—Co, Sm—Co, Tb—Fe—Ni, Gd—Tb—Fe—Co, Dy—Sc—Fe—Co and the like. When the recording layer is formed from magneto optical materials, a structure of the information recording medium does not always correspond to that of FIG. 1. However, the structure and the materials of the interface layers over the both sides of the recording layer of the present invention are preferably applied to such the information recording medium.

The thickness of recording layer 104 is preferably within the range of 6 nm to 15 nm in order to achieve high recording sensitivity for information layer 16. Even within the range, when recording layer 104 is thick, the thermal effect on the adjacent region becomes higher due to the diffusion of the heat along the in-plane direction. Moreover, when recording layer 104 is thin, the reflectance of information layer 16 becomes smaller. Consequently, it is more preferable for the film thickness of recording layer 104 to be within the range 8 nm to 13 nm.

Reflective layer 108 possesses an optical function that is to increase the amount of light absorbed by recording layer 104. In addition, reflective layer 108 possesses a thermal function that is to facilitate the process of recording layer 104 becoming amorphous by rapidly diffusing any heat generated by recording layer 104. Furthermore, reflective layer 108 possesses the capability of protecting multi-layer films from the use environment.

For the material of reflective layer 108, simple metals with high thermal conductivity such as Ag, Au, Cu and Al can be used. Moreover, Al alloys where Cr, Ni, Ti and the like are added to Al, Au alloys where Cu, Cr, Nd and the like are added to Au, Ag alloys where Cu, Pd, Ga, In, Nd and the like are added to Ag, Ag alloys where Pd, Ti, Ru, Au, Ni, Nd, Ga, Ca, In, Gd and the like are added to Ag—Cu, Ag alloys where Au, Pd and the like are added to Ag—Nd, Ag alloys where Sn, Ga and the like are added to Ag—In, and alloys such as Ag—Ga—Sn, Ag—Zn—Al and Cu—Si can also be used. In particular, since Ag alloys have significant thermal conductivity, they are preferred as materials for reflective layer 108. Concentration of the added materials is preferably $\leq 3$ atom %. For the heat diffusion capability of reflective layer 108 to be suitable, a thickness of $\geq 30$ nm is preferred. Also within this range, when reflective layer 108 is thinner than 200 nm, it is possible to prevent its heat diffusion capability from being too great and the recording sensitivity of information layer 16 from decreasing. Therefore, the thickness of reflective layer 108 is desirable within the range of 30 nm to 200 nm.

An interface layer (not shown) can be placed between reflecting layer 108 and second dielectric layer 106. In this case, materials that can be used for the interface layer are those that have a lower thermal conductivity than the materials described for reflecting layer 108. When an Ag alloy is used for reflecting layer 108, for example Al or an Al alloy can be used for the interface layer. Moreover, elements such as Cr, Ni, Si, C and the like, and oxides such as $TiO_2$, $ZrO_2$, $HfO_2$, ZnO, $Nb_2O_5$, $Ta_2O_5$, $SiO_2$, $SnO_2$, $Al_2O_3$, $Bi_2O_3$, $Cr_2O_3$, $Ga_2O_3$, $In_2O_3$, $Y_2O_3$, $Dy_2O_3$ and the like can be used in the interface layer. Additionally, nitrides such as C—N, Ti—N, Zr—N, Nb—N, Ta—N, Si—N, Ge—N, Cr—N, Al—N, Ge—Si—N, Ge—Cr—N and the like can be used. In addition, sulfides such as ZnS and the like, carbides such as SiC and the like, fluorides such as $LaF_3$, $CeF_3$ and the like and carbon can also be used. Moreover, mixtures of the above materials can also be used. Additionally, the thickness of the interface layer is preferably within the range of 2 nm to 50 nm (more preferably within the range of 2 nm to 20 nm).

For information layer 16, with recording layer 104 having reflectance $R_c$ (%) when in the crystalline phase and reflectance $R_a$ (%) when in the amorphous phase, it is preferred when these satisfy the relation $R_a < R_c$. When this is the case, the reflectance is high in the initial state when information has not been recorded, so that recording and reproducing operations can be carried out in a stable manner. In addition, to obtain a larger reflectance difference ($R_c - R_a$) and favorable recording and reproducing characteristics, it is preferable for $R_c$ and $R_a$ to satisfy $0.2 \leq R_a \leq 10$ and $12 \leq R_c \leq 40$, and it is more preferable for them to satisfy $0.2 \leq R_a \leq 5$ and $12 \leq R_c \leq 30$.

Information recording medium 15 can be manufactured by the method explained below.

First, information layer 16 is laminated over substrate 14 (of thickness 1.1 mm, for example). The information layer 16 is constituted from a single-layer film or a multi-layer film, and such layers can be formed within a coating apparatus through the use of sequential sputtering with a sputtering target including materials of each layer.

Specifically, first reflecting layer 108 is formed over substrate 14. Reflecting layer 108 is formed by sputtering with a sputtering target constituted from a metal or alloy that constitutes reflecting layer 108 in an atmosphere of Ar gas, or in an atmosphere of a gas mixture of Ar gas and a reaction gas (at least one gas selected from $O_2$ gas and $N_2$ gas).

Next, depending on the requirements, interface layer is formed over reflecting layer 108. Interface layer is formed by sputtering with a sputtering target constituted from an element or compound that constitutes interface layer in an atmosphere of Ar gas, or in an atmosphere of a gas mixture of Ar gas and a reaction gas.

Subsequently, second dielectric layer 106 is formed over reflective layer 108 or interface layer. Second dielectric layer 106 is formed by sputtering with a sputtering target constituted from an element or compound that constitutes second dielectric layer 106 in an atmosphere of Ar gas, or in an atmosphere of a gas mixture of Ar gas and a reaction gas. Moreover, second dielectric layer 106 is formed by reactive sputtering with a sputtering target constituted from a metal that constitutes second dielectric layer 106 in an atmosphere of a gas mixture of Ar gas and a reaction gas.

Next, second interface layer 105 is formed over reflective layer 108, interface layer or second dielectric layer 106. Second interface layer 105 can be formed in substantially the same manner as for second dielectric layer 106.

Next, recording layer 104 is formed over second interface layer 105. Depending on its composition, recording layer 104 can be formed by sputtering with the use of a single power source with a sputtering target constituted from Ge—Te-M3 alloy, or a sputtering target constituted from Ge-M4—Te-M3 alloy, or a sputtering target constituted from Sb-M6 alloy.

For the atmosphere gas used for sputtering, Ar gas, Kr gas, a gas mixture with Ar gas and a reaction gas, or a gas mixture with Kr gas and a reaction gas can be used. Moreover, recording layer 104 can be formed by simultaneous sputtering with the use of a plurality of power sources from various sputtering targets of Ge, Te, M3, M4, Sb or M6. In addition, recording layer 104 can be formed by simultaneous sputtering with the use of a plurality of power sources from a binary sputtering target or a ternary sputtering target and the like that combines any of the elements from Ge, Te, M3, M4, Sb or M6. In these cases also, the recording layer can be formed by sputtering in an atmosphere of Ar gas, an atmosphere of Kr gas, an atmosphere of a gas mixture with Ar gas and a reaction gas, or an atmosphere of a gas mixture with Kr gas and a reaction gas can be used.

Next, first interface layer 103 is formed over recording layer 104. First interface layer 103 can be formed in substantially the same manner as for second dielectric layer 106.

Next, first dielectric layer 102 is formed over first interface layer 103. First dielectric layer 102 can be formed in substantially the same manner as for second dielectric layer 106.

Finally, transparent layer 13 is formed over first dielectric layer 102. Transparent layer 13 can be formed over first dielectric layer 102 by applying a photocurable resin (particularly an ultra violet radiation-curable resin) or a slow-acting resin as a spin coating, after which the resin is cured. Additionally, it is also suitable to use a transparent disk of a resin such as polycarbonate, amorphous polyolefin, PMMA and the like, or a substrate of glass and the like for transparent layer 13. In this case, transparent layer 13 can be formed by applying a resin such as a photocurable resin (particularly an ultra violet radiation-curable resin) or a slow-acting resin and the like over first dielectric layer 102, and after the substrate is bonded over first dielectric layer 102 by spin coating the resin is cured. Moreover, an adhesive resin is applied uniformly to the substrate beforehand, and this can be bonded to first dielectric layer 102.

Furthermore, after first dielectric layer 102 is formed, or after transparent layer 13 is formed, depending on the requirements it is also favorable to carry out an initialization process in which the entire recording layer 104 is crystallized. The crystallization of recording layer 104 can be carried out by irradiating with a laser beam.

Information recording medium 15 can be manufactured in the above manner. Furthermore, while each of the layers is formed by using the sputtering method in the present embodiment, the embodiment is not limited to this method and it is also possible to use a vacuum deposition method, an ion plating method, a CVD method, an MBE method and the like.

In addition, the order of forming each layers are not limited to the above-mentioned order.

Embodiment 2

Figure 2:
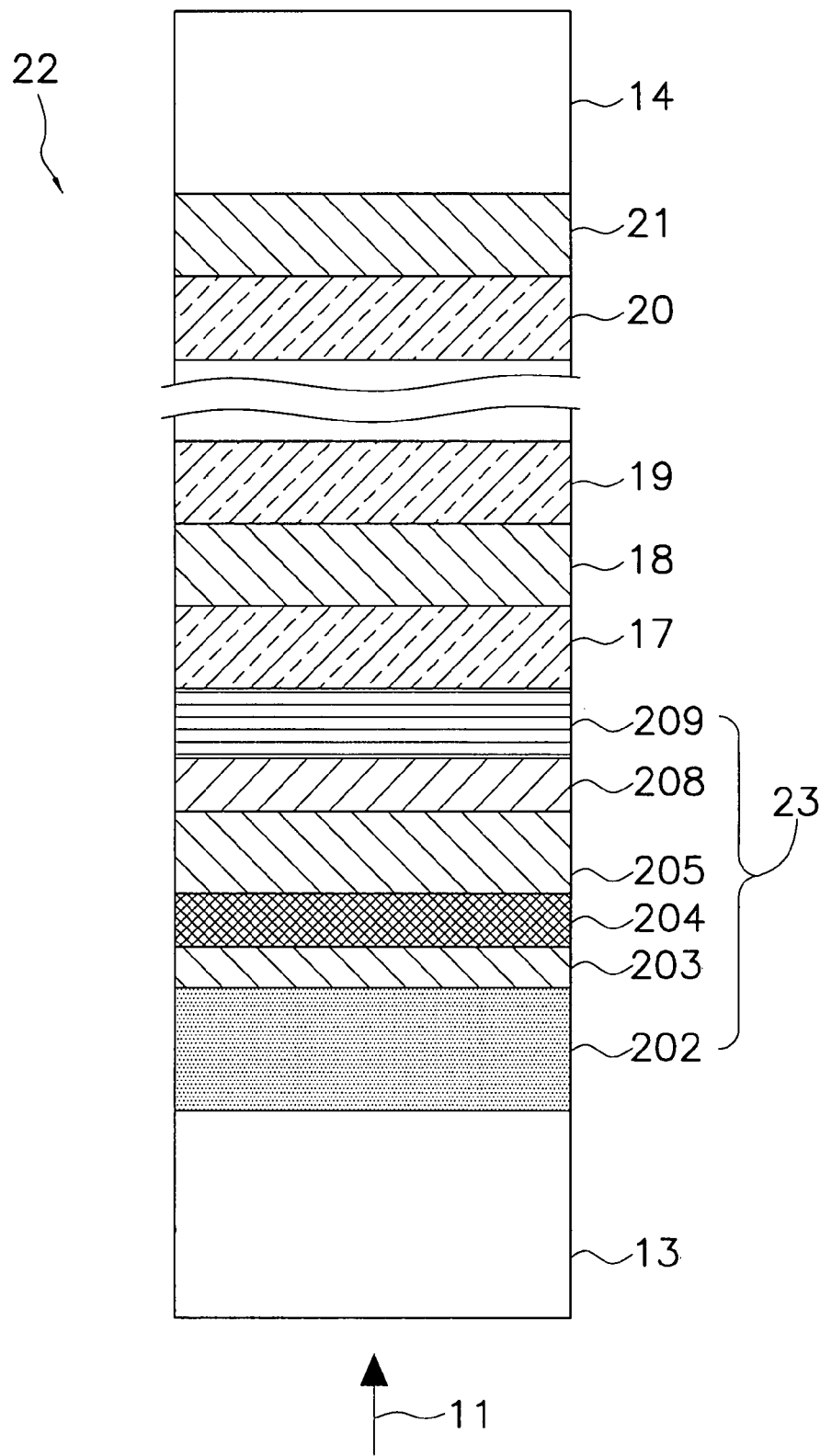
FIG. 2 is a cross-sectional diagram showing an example of a layer structure on an information recording medium comprising N information layers of the present invention.

An example of an information recording medium of the present invention is explained in Embodiment 2. A partial cross-sectional diagram of information recording medium 22 of Embodiment 2 is shown in FIG. 2. Information recording medium 22 is an optical information recording medium wherein it is possible to record and/or reproduce information by irradiating with laser beam 11.

Information recording medium 22 is constituted on substrate 14 from N groups (where N is a natural number that satisfies $N \geq 2$) of information layers 21 and 18, first information layer 23 and transparent layer 13 through sequential lamination of optical separation layers 20, 19, 17 and the like. Here, the first information layer 23 and information layer 18, which are not over $(N-1)^{th}$ phase from the laser beam 11 incident side (the $N^{th}$ information layer counting from the laser beam 11 incident side is referred to below as the $N^{th}$ information layer), are transparent-type information layers. Substantially the same materials as were used in Embodiment 1 can be used in substrate 14 and transparent layer 13. In addition, these will also have substantially the same form and function as was explained in Embodiment 1.

The material of optical separation layers 20, 19, 17 and the like is constituted from a resin such as a photocurable resin (particularly an ultra violet radiation-curable resin) or a slow-acting resin as well as a dielectric and the like, preferably with low light absorption with respect to laser beam 11 being used, and preferably with low optical birefringence in the short-wavelength region.

Optical separation layers 20, 19, 17 and the like are layers that are provided in order to differentiate the corresponding focus positions for first information layer 23, information layers 18 and 21 and the like for information recording medium 22. It is necessary for the thickness of optical separation layers 20, 19, 17 and the like to be greater than or equal to that is the focal depth ($\Delta Z$) that is determined by the numerical aperture (NA) of the objective lens and the wavelength of laser beam 11 ($\lambda$). When the standard focal point intensity can be assumed to be 80% of the aplanatic case, $\Delta Z$ can be approximated by $\Delta Z = \lambda/[2(NA)^2]$. When $\lambda=405$ nm and NA=0.85, $\Delta Z$ equals to 0.280 µm, and if $\Delta Z$ is within ±0.3 µm from the value, it is still said to be within the focal depth. For this reason, it is necessary in this case for the thickness of optical separation layers 20, 19, 17 and the like to be $\geq 0.6$ µm. It is desirable for the path between first information layer 23, and information layers 18, 21 and the like to be within the focusable range of laser beam 11 used for the objective lens. Consequently, the total thickness of optical separation layers 20, 19, 17 and the like are preferably within the tolerance allowable for the objective lens (for example, $\leq 50$ µm).

Depending on the requirements, it is satisfactory to form a guide groove to guide the laser beam on the surface of laser beam 11 incident side of optical separation layers 20, 19, 17 and the like.

In this case, with laser beam 11 irradiating from only one side, it is possible to carry out recording and reproducing operations with laser beam 11 on the $K^{th}$ information layer (where K is a natural number such that $1 < K \leq N$) with the laser beam passing through the first through $(K-1)^{th}$ information layers.

Furthermore, any one from the first information layer to the $N^{th}$ first information layer can also be an information layer for dedicated reproducing use (ROM, Read Only Memory), as well as a write-once information layer (WO, Write Once) that can only be recorded upon a single time The structure of first information layer 23 is explained in detail below.

First information layer 23 is provided with third dielectric layer 202, third interface layer 203, first recording layer 204, fourth interface layer 205, first reflecting layer 208, and adjustable transmittance layer 209, positioned in order from the laser beam 11 incident side.

Materials substantially the same as those in first dielectric layer 102 of Embodiment 1 can be used in third dielectric layer 202. Additionally, the function of third dielectric layer 202 is substantially the same as for first dielectric layer 102 of Embodiment 1.

In general, the thicknesses of third dielectric layer 202 can be determined exactly according to a calculation based on the matrix method, so as to satisfy conditions that increase the change in the amount of reflected light between the crystalline phase and amorphous phase of first recording layer 204, increase the light absorption in recording layer 204, and increase the transmittance of first information layer 23.

Materials substantially the same as those used for first interface layer 103 in Embodiment 1 can be used in third interface layer 203. Moreover, the function and form of the interface layer 203 will also be substantially the same as for first interface layer 103 in Embodiment 1.

Fourth interface layer 205 adjusts the optical path and acts to elevate the light absorption efficiency of first recording layer 204, and has the function of increasing the magnitude in the change in the amount of reflected light before and after recording and to increase the signal intensity.

The same series of materials as was used in second interface layer 105 in Embodiment 1 can be used in fourth interface layer 205. In addition, the thickness of fourth interface layer 205 is preferably within the range of 0.5 nm to 75 nm, and is more preferably within the range of 1 nm to 40 nm. By selecting a thickness for fourth interface layer 205 within this range, any heat generated in first recording layer 204 can be effectively dissipated on the side of first reflective layer 208.

Furthermore, fourth dielectric layer 206 can be positioned between fourth interface layer 205 and first reflective layer 208 in first information layer 23. Substantially the same series of materials as was used in third dielectric layer 202 can be used in fourth dielectric layer 206. Particularly, materials containing In and O are preferable.

First recording layer 204 is constituted from a material that undergoes a phase-change between a crystalline phase and an amorphous phase due to irradiation with laser beam 11. First recording layer 204 can be formed, for example, from a material that includes Ge, Te, or M3. Specifically, first recording layer 204 can be formed from a material that can be represented by the composition formula $Ge_aM3_bTe_{3+a}$. When a satisfies the relationship $0<a\leq60$, the amorphous state is stable, and favorable recording storage stability with a low transfer rate and favorable overwriting capability with a high transfer rate can be obtained. It is more preferable to satisfy the relationship $4\leq a\leq 40$. Moreover, for the amorphous phase to be stable and to have little reduction in the crystallization speed, it is preferable to satisfy the relationship $1.5\leq b\leq 7$, and it is more preferable to satisfy the relationship $2\leq b\leq 4$.

Additionally, first recording layer 204 can be formed from a material that can be represented by the composition formula $(Ge-M4)_aM3b\ Te_{3+a}$. When this material is used, since the element M3 that substitutes for Ge will increase the crystallizability, it is possible to obtain satisfactory erase ratios even when the thickness of first recording layer 204 is thin. For element M4, Sn is more preferable from the perspective of being less toxic. When this material is used, it is preferable for $0<a\leq 60$ (with $4\leq a\leq 40$ being more preferable), and $1.5\leq b\leq 7$ (with $2\leq b\leq 4$ being more preferable).

For first information layer 23, in order to achieve the required quantity of laser beam for the recording and reproducing operations in the information layer on the side more distal than first information layer 23 from the laser beam 11 incident side, and to make the laser beam reach the information layer on the side more distal than first information layer 23, first information layer 23 must have high transmittance. Therefore, the thickness of first recording layer 204 is preferable $\leq 9$ nm, and is more preferable within the range of 2 nm to 8 nm.

First reflecting layer 208 possesses an optical function that is to increase the amount of light absorbed by first recording layer 204. Moreover, first reflective layer 208 possesses a thermal function of rapidly diffusing any heat generated by first recording layer 204 and to facilitate the process of first recording layer 204 becoming amorphous. Furthermore, reflective layer 208 possesses the function of protecting multi-layer films from the use environment.

Substantially the same materials as were used for reflective layer 108 in Embodiment 1 can be used in first reflective layer 208. Additionally, the function of first reflective layer 208 is substantially the same as for reflective layer 108 of Embodiment 1. In particular, since Ag alloys have significant thermal conductivity, they are preferred as materials for first reflective layer 208.

In order for first information layer 23 to have the highest possible transmittance, the thickness of first reflective layer 208 is preferably within the range of 3 nm to 15 nm, and is more preferably within the range of 8 nm to 12 nm. When first reflective layer 208 has a thickness within this range, its heat diffusion function will be suitable, and it will be able to maintain the reflectance of first information layer 23, and furthermore the transmittance of first information layer 23 will be suitable.

Adjustable transmittance layer 209 is constituted from a dielectric, and functions to adjust the transmittance of first information layer 23. Adjustable transmittance layer 209 makes it possible to achieve both a higher transmittance $T_c$ (%) of first information layer 23 when first recording layer 204 is in a crystalline phase and a higher transmittance $T_a$ (%) of first information layer 23 when first recording layer 204 is in an amorphous phase. Specifically, the level of transmittance in first information layer 23 is raised by from 2% to 10% when it is provided with adjustable transmittance layer 209 as compared to when the adjustable transmittance layer 209 is absent. In addition, adjustable transmittance layer 209 also functions effectively to diffuse any heat generated in first recording layer 204.

In order to raise the transmittances $T_c$ and $T_a$ of first information layer 23 higher, it is preferable for the refractive index n and extinction coefficient k of adjustable transmittance layer 209 to satisfy the conditions $2.0\leq n$ and $k\leq 0.1$, and it is more preferable to satisfy the conditions $2.4\leq n\leq 3.0$ and $k\leq 0.05$.

The thickness d of adjustable transmittance layer 209 is preferably within the range $(1/32)\lambda/n\leq d\leq(3/16)\lambda/n$ or $(17/32)\lambda/n\leq d\leq(11/16)\lambda/n$, and is more preferably within the range $(1/16)\lambda/n\leq d\leq(5/32)\lambda/n$ or $(9/16)\lambda/n\leq d\leq(21/32)\lambda/n$. Furthermore, based on the wavelength $\lambda$ of laser beam 11 and refractive index n of adjustable transmittance layer 209, for example, by selecting 350 nm$\leq\lambda\leq$450 nm and $2.0\leq n\leq 3.0$, it is preferable for the abovementioned ranges to be 3 nm$\leq d\leq$40 nm or 60 nm$\leq d\leq$130 nm, and it is more preferable for the ranges to be 7 nm$\leq d\leq$30 nm or 65 nm$\leq d\leq$120 nm. By selecting d within these ranges, both the transmittances $T_c$ and $T_a$ of first information layer 23 can be higher.

Oxides such as $TiO_2$, $ZrO_2$, $HfO_2$, ZnO, $Nb_2O_5$, $Ta_2O_5$, $SiO_2$, $Al_2O_3$, $Bi_2O_3$, $Cr_2O_3$, $Ga_2O_3$, $In_2O_3$, $Y_2O_3$, $Dy_2O_3$, Sr—O and the like can be used as the material for adjustable transmittance layer 209. Additionally, nitrides such as Ti—N, Zr—N, Nb—N, Ta—N, Si—N, Ge—N, Cr—N, Al—N, Ge—Si—N, Ge—Cr—N and the like can be used. Moreover, sulfides such as ZnS can be used. In addition, mixtures of the above materials can also be used. Among these, in particular $TiO_2$ and materials including $TiO_2$ are preferred. Since materials such as these have a higher refractive index (n=2.6 to 2.8), a small extinction coefficient (k=0.0 to 0.05), this also raises the transmittance of first information layer 23 higher.

The transmittance $T_c$ and $T_a$ of first information layer 23 preferably satisfy the condition $40<T_c$ and $40<T_a$ in order for the amount of light of laser beam, which is necessary to record on and/or reproduce from the information layer, to reach the information layer on the side more distal than first information layer 23 from the laser beam 11 incident side. It is more preferable for them to satisfy $46<T_c$ and $46<T_a$.

Transmittances $T_a$ and $T_c$ of first information layer 23 preferably satisfy the condition $-5 \leq (T_c-T_a) \leq 5$, and more preferably satisfy the condition $-3 \leq (T_c-T_a) \leq 3$. When $T_c$ and $T_a$ satisfy these conditions, there is a smaller effect of the change in transmittance due to the status of first recording layer 204 in first information layer 23 during recording and reproducing operations of the information layer on the side more distal than first information layer 23 from the laser beam 11 incident side, and favorable recording and reproducing characteristics are obtained.

In first information layer 23, for reflectance $R_{c1}$(%) when first recording layer 204 is in a crystalline phase and reflectance $R_{a1}$(%) when first recording layer 204 is in an amorphous phase, it is preferable if the condition $R_{a1}<R_{c1}$ is satisfied. When this is the case, the reflectance is high in the initial state when information has not been recorded, so that recording and reproducing operations can be carried out in a stable manner. In addition, to obtain a larger reflectance difference ($R_{c1}-R_{a1}$) and favorable recording and reproducing characteristics, it is preferable for $R_{c1}$ and $R_{a1}$ to satisfy $0.1 \leq R_{a1} \leq 5$ and $4 \leq R_{c1} \leq 15$, and it is more preferable for them to satisfy $0.1 \leq R_{a1} \leq 3$ and $4 \leq R_{c1} \leq 10$.

Information recording medium 22 can be manufactured by the method explained below.

First, information layers of N−1 layers are laminated sequentially with optical separation layers there between over substrate 14 (for example, with a thickness of 1.1 mm). The information layer is constituted from a single-layer film or a multi-layer film, and such layers can be formed within a coating apparatus through the use of sequential sputtering with a sputtering target constituted from the material.

Additionally, the optical separation layers can be formed by applying a resin such as a photocurable resin (particularly an ultra violet radiation-curable resin) or a slow-acting resin and the like over the information layer, after which substrate 14 is rotated so that the resin extends uniformly (spin coating) and then the resin is cured. Furthermore, when the optical separation layer is provided with a guide groove for laser beam 11, the guide groove can be formed by bonding a resin to a substrate (mold) that forms the groove prior to curing, followed by the mold covered with the substrate 14 being rotated to perform spin coating, and removing the substrate (mold) after the resin is cured.

After laminating information layers of N−1 layers with optical separation layers there between over substrate 14, proceeding in this manner prepares for forming optical separation layer 17.

Next, first information layer 23 is formed over optical separation layer 17. Specifically, after first being laminated with N−1 layers using information layers and optical separation layers, substrate 14 with formed optical separation layer 17 is positioned within a coating apparatus and adjustable transmittance layer 209 is formed over optical separation layer 17. Adjustable transmittance layer 209 can be formed in substantially the same manner as for second dielectric layer 106 in Embodiment 1.

Next, first reflective layer 208 is formed over adjustable transmittance layer 209. First reflective layer 208 can be formed in substantially the same manner as for second reflective layer 108 in Embodiment 1.

Next, fourth dielectric layer 206 is formed over first reflective layer 208. Fourth dielectric layer 206 can be formed in substantially the same manner as for second dielectric layer 106 in Embodiment 1.

Next, fourth interface layer 205 is formed over first reflective layer 208 or fourth dielectric layer 206. Fourth interface layer 205 can be formed in substantially the same manner as for second dielectric layer 106 in Embodiment 1.

Next, first recording layer 204 is formed over fourth interface layer 205. First recording layer 204 can be formed in substantially the same manner as for recording layer 104 in Embodiment 1, by using a sputtering target that corresponds to its composition.

Next, third interface layer 203 is formed over first recording layer 204. Third interface layer 203 can be formed in substantially the same manner as for second dielectric layer 106 in Embodiment 1.

Next, third dielectric layer 202 is formed over third interface layer 203. Third dielectric layer 202 can be formed in substantially the same manner as for second dielectric layer 106 in Embodiment 1.

Finally, transparent layer 13 is formed over third dielectric layer 202. Transparent layer 13 is formed by the method explained in Embodiment 1.

Furthermore, after third dielectric layer 202 is formed, or after transparent layer 13 is formed, depending on the requirements, it is also favorable to carry out an initialization process in which the entire first recording layer 204 is crystallized. The crystallization of first recording layer 204 can be carried out by irradiating with a laser beam.

Information recording medium 22 can be manufactured in the above manner. Furthermore, while each of the layers is formed by using the sputtering method in the present embodiment, the embodiment is not limited to this method and it is also possible to use a vacuum deposition method, an ion plating method, a CVD method, an MBE method and the like.

In addition, the order of forming each layers are not limited to the above-mentioned order.

Embodiment 3

Figure 3:
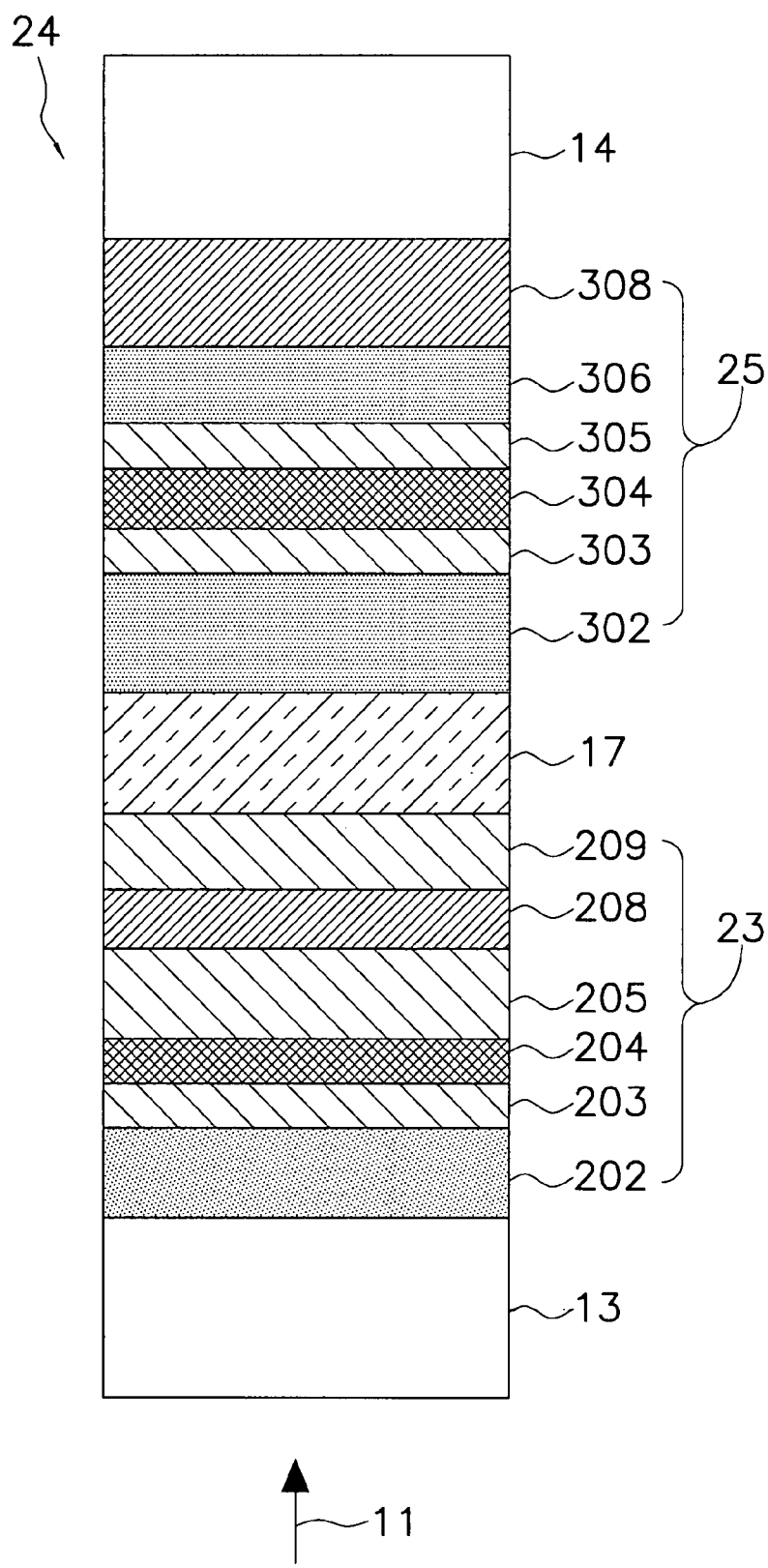
FIG. 3 is a cross-sectional diagram showing an example of a layer structure on an information recording medium comprising two information layers of the present invention.

In Embodiment 3, N=2 in the multilayer optical information recording medium of the present invention in Embodiment 2, in other words an example of an information recording medium that uses biphasic information layers is explained. A partial cross-sectional diagram of information recording medium 24 of Embodiment 3 is shown in FIG. 3. Information recording medium 24 is a bilayer optical information recording medium wherein it is possible to record and/or reproduce information by irradiating with laser beam 11 from one side.

Information recording medium 24 is constituted from second information layer 25, optical separation layer 17, first information layer 23 and transparent layer 13 that are sequentially laminated over substrate 14. Materials substantially the same as those in the explanations in Embodiments 1 and 2 can be used in substrate 14, optical separation layer 17, first information layer 23 and transparent layer 13. In addition, these will also have substantially the same form and function as was explained in Embodiments 1 and 2.

The structure of second information layer 25 is explained in detail below.

Second information layer 25 is provided with first dielectric layer 302, first interface layer 303, second recording layer 304, second interface layer 305, second dielectric layer 306 and second reflecting layer 308, positioned in order from the laser beam 11 incident side. Recording and reproducing operations can be carried out on second information layer 25 by using laser beam 11 that passes through transparent layer 13, first information layer 23 and optical separation layer 17.

Substantially the same materials as were used in first dielectric layer 102 of Embodiment 1 can be used in first dielectric layer 302. Additionally, the function of first dielectric layer 302 is substantially the same as for first dielectric layer 102 of Embodiment 1.

In general, the thicknesses of first dielectric layer 302 can be determined exactly according to a calculation based on the matrix method, so as to satisfy conditions that increase the change in the amount of reflected light between the crystalline phase and amorphous phase of second recording layer 304.

Substantially the same materials as were used for first interface layer 103 in Embodiment 1 can be used in first interface layer 303. Moreover, the function and form of the interface layer will also be substantially the same as was explained for first interface layer 103 in Embodiment 1.

Substantially the same materials as were used for second interface layer 105 in Embodiment 1 can be used in second interface layer 305. Moreover, the function and form of the interface layer will also be substantially the same as was explained for second interface layer 105 in Embodiment 1.

Substantially the same materials used in second dielectric layer 106 of Embodiment 1 can be used in second dielectric layer 306. Additionally, the function and form of the dielectric layer will also be substantially the same as for second dielectric layer 106 of Embodiment 1.

Second recording layer 304 can be formed from substantially the same materials as were used for recording layer 104 of Embodiment 1. The thickness of second recording layer 304 is preferably within the range of 6 nm to 15 nm in order to achieve high recording sensitivity for second information layer 25. Even within the range, when recording layer 304 is thick, the thermal effect on the adjacent region becomes higher due to the diffusion of the heat along the in-plane direction. Moreover, when second recording layer 304 is thin, the reflectance of second information layer 25 becomes smaller. Consequently, it is more preferable for the film thickness of second recording layer 304 to be within the range 8 nm to 13 nm.

Substantially the same materials as were used for reflective layer 108 in Embodiment 1 can be used in second reflective layer 308. Moreover, the function and form of the interface layer will also be substantially the same as was explained for reflective layer 108 in Embodiment 1.

An interface layer can be placed between second reflecting layer 308 and second dielectric layer 306. For the interface layer, substantially the same materials as were used for the interface layer in Embodiment 1 can be used. In addition, these will also have substantially the same form and function as the interface layer in Embodiment 1.

Information recording medium 24 can be manufactured by the method explained below.

First, second information layer 25 is formed.

Specifically, substrate 14 (for example, of thickness 1.1 mm) is first prepared and is positioned within a coating apparatus.

Next, second reflective layer 308 is formed over substrate 14. At this time, if a guide groove for the purpose of guiding laser beam 11 is to be formed on substrate 14, second reflective layer 308 is formed on the side where the guide groove is formed. Second reflective layer 308 can be formed in substantially the same manner as for reflective layer 108 in Embodiment 1.

Next, interface layer 207 is formed over second reflective layer 308. Interface layer 207 can be formed in substantially the same manner as for second dielectric layer 106 in Embodiment 1.

Next, second dielectric layer 306 is formed over second reflective layer 308 or interface layer. Second dielectric layer 306 can be formed in substantially the same manner as for second dielectric layer 106 in Embodiment 1.

Next, second interface layer 305 is formed over second reflective layer 308, interface layer or second dielectric layer 306. Second interface layer 305 can be formed in substantially the same manner as for second dielectric layer 106 in Embodiment 1.

Next, second recording layer 304 is formed over second interface layer 305. Second recording layer 304 can be formed in substantially the same manner as for recording layer 104 in Embodiment 1, by using a sputtering target that corresponds to its composition.

Next, first interface layer 303 is formed over second recording layer 304. First interface layer 303 can be formed in substantially the same manner as for second dielectric layer 106 in Embodiment 1.

Next, first dielectric layer 302 is formed over second interface layer 303. First dielectric layer 302 can be formed in substantially the same manner as for second dielectric layer 106 in Embodiment 1.

Then, Next, optical separation layer 17 is formed over first dielectric layer 302 of second information layer 25. Optical separation layer 17 can be formed over first dielectric layer 302 by applying a photocurable resin (particularly an ultra violet radiation-curable resin) or a slow-acting resin as a spin coating, after which the resin is cured. Furthermore, when optical separation layer 17 is provided with a guide groove for laser beam 11, the guide groove can be formed by bonding resin to a substrate (mold) that forms the groove prior to curing, after which the resin is cured and then the substrate (mold) is taken up.

Moreover, after second dielectric layer 302 is formed, or after optical separation layer 17 is formed, depending on the requirements it is also suitable to carry out an initialization process in which the entire second recording layer 304 is crystallized. The crystallization of second recording layer 304 can be carried out by irradiating with laser beam 11.

Next, first information layer 23 is formed over optical separation layer 17.

Specifically, films of adjustable transmittance layer 209, first reflective layer 208, fourth interface layer 205, first recording layer 204, third interface layer 203 and third dielectric layer 202 are first formed in order over optical separation layer 17. At this time, fourth dielectric layer 206 can be formed between first reflective layer 208 and fourth interface layer 205. Each of these layers can be formed by methods explained in Embodiment 2.

Finally, transparent layer 13 is formed over third dielectric layer 202. Transparent layer 13 is formed by the method explained in Embodiment 1.

Furthermore, after third dielectric layer 202 is formed, or after transparent layer 13 is formed, depending on the requirements it is also favorable to carry out an initialization process in which the entire first recording layer 204 is crystallized. The crystallization of first recording layer 204 can be carried out by irradiating with a laser beam.

Additionally, after third dielectric layer 202 is formed, or after transparent layer 13 is formed, depending on the requirements it is also favorable to carry out an initialization process in which the entire second recording layer 304 and first recording layer 204 are crystallized. In this case, if the crystallization of first recording layer 204 is carried out first, there is a tendency for the laser power required to crystallize second recording layer 304 to grow larger, so that it is preferable for second recording layer 304 to be crystallized first.

Information recording medium 24 can be manufactured in the above manner. Furthermore, while each of the layers is formed by using the sputtering method in the present embodiment, the embodiment is not limited to this method and it is also possible to use a vacuum deposition method, an ion plating method, a CVD method, an MBE method and the like.

In addition, the order of forming each layers are not limited to the above-mentioned order.

Embodiment 4

Figure 4:
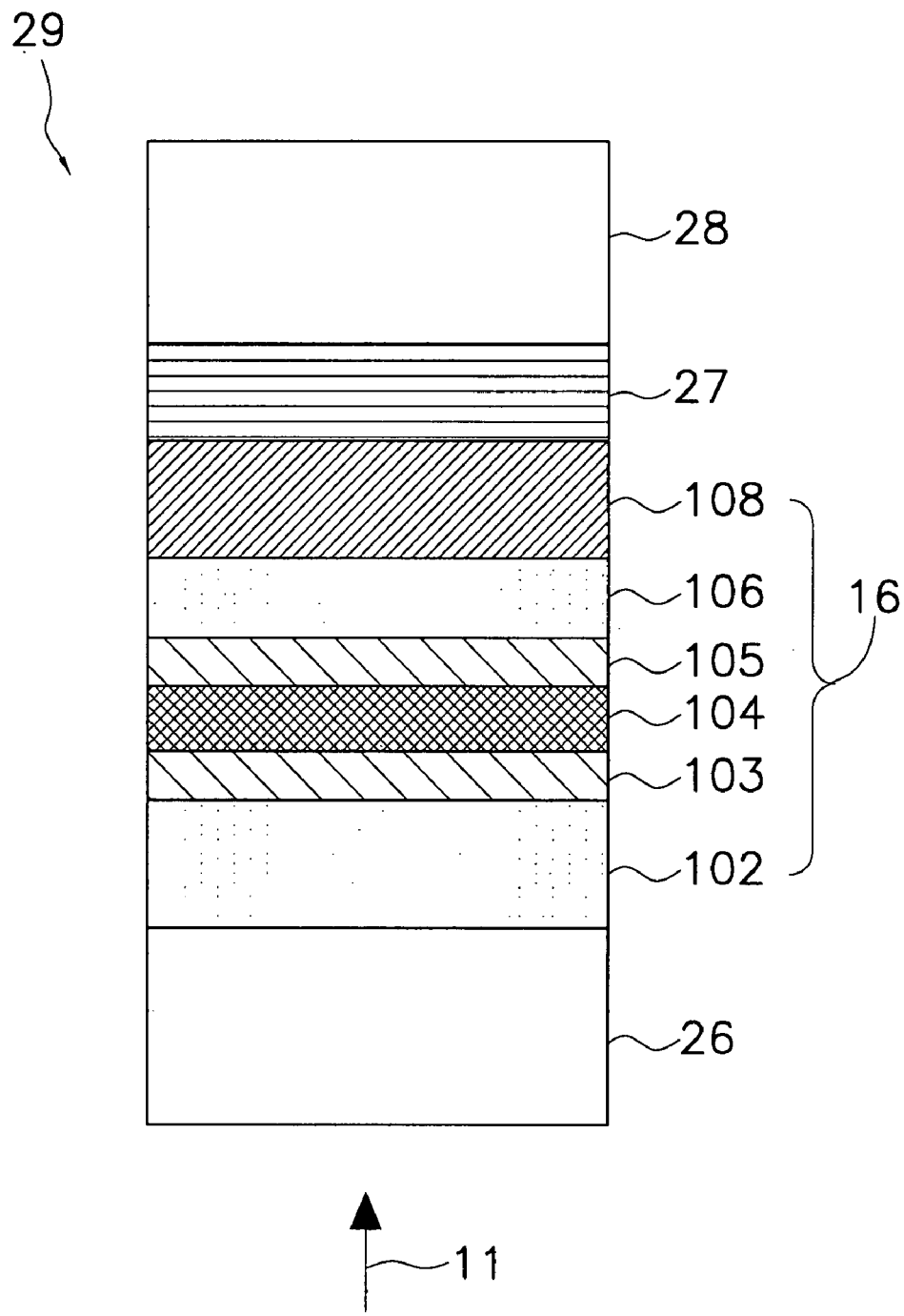
FIG. 4 is a cross-sectional diagram showing an example of a layer structure on an information recording medium comprising one information layer of the present invention.

An other example of an information recording medium of the present invention is explained in Embodiment 4. A partial cross-sectional diagram of information recording medium 29 of Embodiment 4 is shown in FIG. 4. Like the information recording medium 15 of Embodiment 1, information recording medium 29 is an optical information recording medium wherein it is possible to record and/or reproduce information by irradiating with laser beam 11.

Information recording medium 29 is constituted from substrate 26 over which information layer 16 and dummy substrate 28 have been laminated, where these are bonded together through adhesive layer 27.

Substrate 26 and dummy substrate 28 are transparent disk-shaped plates. Resins such as polycarbonate, amorphous polyolefin, PMMA and the like, or glass and the like can be used in substrate 26 and dummy substrate 28, in substantially the same manner as for substrate 14 in Embodiment 1.

Depending on the requirements, a guide groove (track pitch: 0.615 μm) for guiding a laser beam can be formed on the surface of first dielectric layer 102 side of substrate 26. It is preferable for the surface of substrate 26, which is the opposite side of the first dielectric layer 102 side, and the surface of dummy substrate 28, which is the opposite side of the adhesive layer 27 side, to be smooth. For the material of substrate 26 and dummy substrate 28, polycarbonate is particularly useful from the perspective of superior transcribability, mass producibility and low cost. Furthermore, the thickness of substrate 26 and dummy substrate 28 is preferably within the range of 0.3 nm to 0.9 nm, so as to these substrates have enough strength and the thickness of information recording medium 29 becomes 1.2 mm.

Adhesive layer 27 is constituted from a resin such as a photocurable resin (particularly an ultra violet radiation-curable resin) or a slow-acting resin that preferably has low light absorption for laser beam 11 that is used, and preferably has low optical birefringence in the short-wavelength region. Furthermore, the thickness of adhesive layer 27 is preferably within the range of 0.6 μm to 50 μm because of the same reasons in the cases of optical separation layer 19 and 17.

In addition, where a component is identified by the same symbol as was used in Embodiment 1, it will be omitted from the explanation.

Information recording medium 29 can be manufactured by the method explained below.

First, information layer 16 is formed over substrate 26 (of thickness 0.6 mm, for example). At this time, if a guide groove for the purpose of guiding laser beam 11 is to be formed in substrate 26, information layer 16 is formed on the side where the guide groove is formed. Specifically, substrate 26 is positioned within a coating apparatus, and first dielectric layer 102, first interface layer 103, recording layer 104, second interface layer 105, second dielectric layer 106 and reflective layer 108 are laminated on sequentially. Furthermore, depending on the requirements, an interface layer is formed between second dielectric layer 106 and reflective layer 108. Also, depending on the requirements, second dielectric layer 106 can be absent. The methods for forming the films of the various layers are substantially the same as in Embodiment 1. Furthermore, the thickness of first dielectric layer 102 is desirable within the range of 50 nm to 250 nm, and is more desirable within the range of 80 nm to 180 nm. Also, the thickness of second dielectric layer 106 is desirable within the range of 10 nm to 100 nm, and is more desirable within the range of 20 nm to 70 nm. When second dielectric layer 106 is not formed, the thickness of second interface layer 105 is desirable within the range of 10 nm to 100 nm, and is more preferable within the range of 20 nm to 70 nm.

Next, substrate 26 with laminated information layer 16 and dummy substrate 28 (for example, of thickness 0.6 mm) are bonded together using adhesive layer 27. Specifically, a resin such as a photocurable resin (particularly an ultra violet radiation-curable resin) or a slow-acting resin is applied to dummy substrate 28, and after dummy substrate 28 with the adhering spin coating is bonded to substrate 26 with laminated information layer 16, the resin can be cured. Moreover, an adhesive resin is uniformly applied over dummy substrate 28 beforehand, so that this can be bonded to substrate 26 with laminated information layer 16.

Furthermore, after substrate 26 and dummy substrate 28 are bonded together, depending on the requirements, an initialization process can be carried out in which the entire recording layer 104 is crystallized. The crystallization of recording layer 104 can be carried out by irradiating with a laser beam.

Information recording medium 29 can be manufactured in the above manner. Furthermore, while each of the layers is formed by using the sputtering method in the present embodiment, the embodiment is not limited to this method and it is also possible to use a vacuum deposition method, an ion plating method, a CVD method, an MBE method and the like.

In addition, the order of forming each layers are not limited to the above-mentioned order.

Embodiment 5

Figure 5:
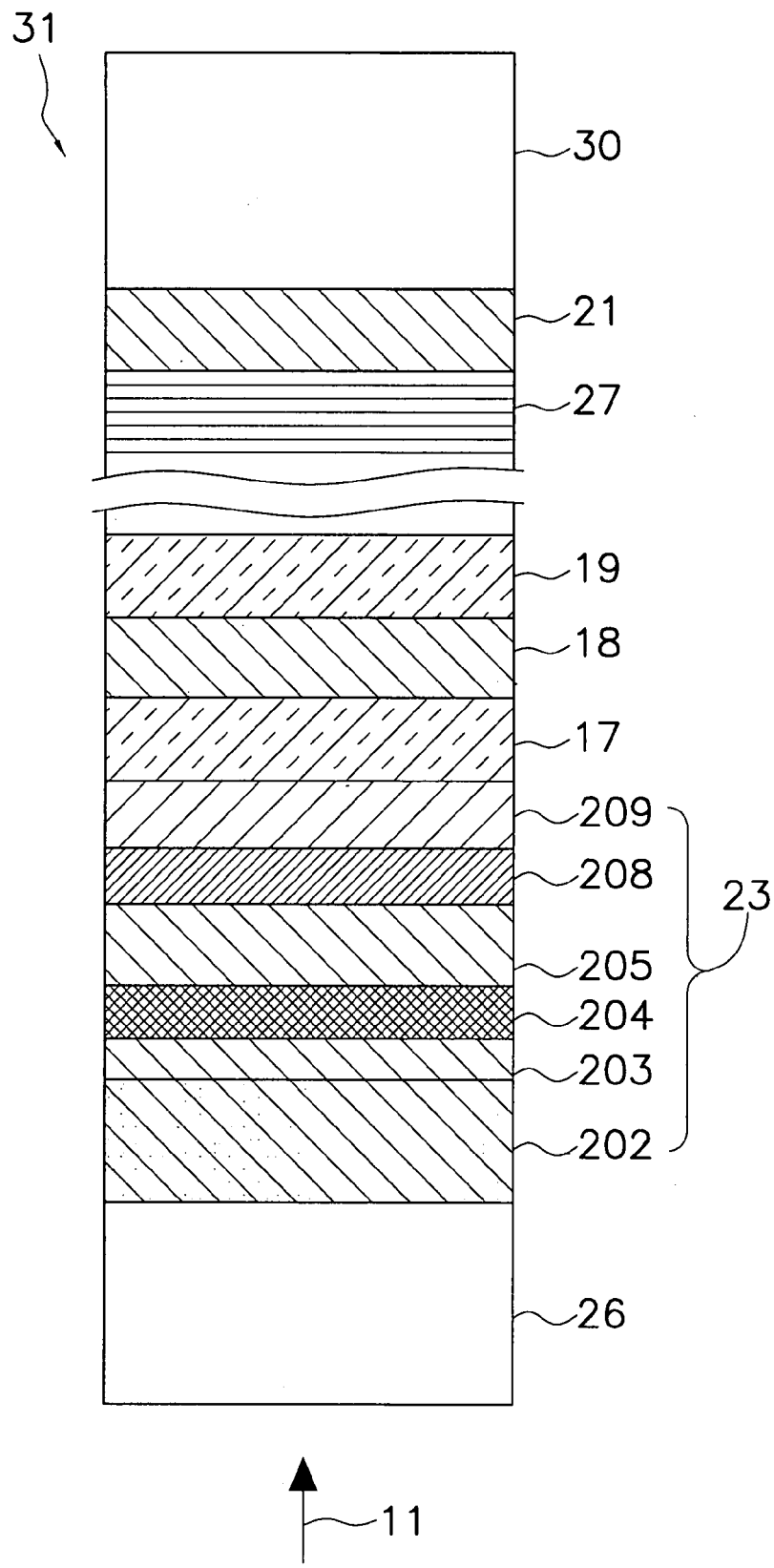
FIG. 5 is a cross-sectional diagram showing an example of a layer structure on an information recording medium comprising N information layers of the present invention.

An example of an information recording medium of the present invention is explained in Embodiment 5. A partial cross-sectional diagram of information recording medium 31 of Embodiment 5 is shown in FIG. 5. Information recording medium 31 is a multilayer optical information recording medium wherein it is possible to record and/or reproduce information by means of irradiating with laser beam 11 from one side in substantially the same manner as for information recording medium 22 of Embodiment 2.

Information recording medium 31 is constituted from N phases of first information layer 23 and information layer 18 sequentially laminated with optical separation layers 17, 19 and the like over substrate 26 and information layer 21 laminated over substrate 30 that are bonded together through adhesive layer 27.

Substrate 30 is a transparent, disk-shaped substrate. In substantially the same manner as for substrate 14, for example, polycarbonate, amorphous polyolefin, PMMA and the like, or glass can be used in substrate 30.

Depending on the requirements, a guide groove for guiding the laser beam can be formed in the surface of the information layer 21 side of substrate 30. It is preferable for a surface of substrate 30, which is the opposite side of the information layer 21 side, to be smooth. For the material of substrate 30, polycarbonate is particularly useful from the perspective of superior transcribability and mass producibility, and low cost. Furthermore, the thickness of substrate 30 is preferable within the range of 0.3 mm to 0.9 mm from the perspective of having sufficient strength and for the thickness of information recording medium 31 to be on the order of 1.2 mm.

In addition, where a component is identified by the same symbol as was used in Embodiments 2 and 4, it will be omitted from the explanation.

Information recording medium 31 can be manufactured by the method explained below.

First information layer 23 is first formed over substrate 26 (of thickness 0.6 mm, for example). At this time, if a guide groove for the purpose of guiding laser beam 11 is to be formed in substrate 26, first information layer 23 is formed on the side where the guide groove is formed. Specifically, substrate 26 is positioned within a coating apparatus, and third dielectric layer 202, third interface layer 203, first recording layer 204, fourth interface layer 205, first reflective layer 208 and adjustable transmittance layer 209 are laminated on sequentially. Furthermore, depending on the requirements, fourth dielectric layer 206 can be formed between fourth interface layer 205 and first reflective layer 208. The methods for forming the films of the various layers are substantially the same as in Embodiment 2. Later, (N-2) information layers are laminated sequentially thorough optical separation layers.

Additionally, information layer 21 is formed over substrate 30 (of thickness 0.6 mm, for example). The information layer is constituted from a single-layer film or a multi-layer film, and such layers can be formed substantially as in Embodiment 2, within a coating apparatus through the use of sequential sputtering with a sputtering target composed of the material.

Finally, substrate 26 with a laminated information layer and substrate 30 are bonded together through adhesive layer 27. Specifically, a resin such as a photocurable resin (particularly an ultra violet radiation-curable resin) or a slow-acting resin is applied over information layer 21, and after the spin coating adhering over information layer 21 is bonded to substrate 26 having information layer 23 formed thereon, the resin can be cured. Additionally, an adhesive resin was uniformly applied over information layer 21 beforehand, so that this can be bonded to substrate 26.

Moreover, after substrate 26 and substrate 30 are bonded together, depending on the requirements, an initialization process can be carried out in which the entire first recording layer 204 is crystallized. The crystallization of first recording layer 204 can be carried out by irradiating with a laser beam.

Information recording medium 31 can be manufactured in the above manner. Furthermore, while each of the layers is formed by using the sputtering method in the present embodiment, the embodiment is not limited to this method and it is also possible to use a vacuum deposition method, an ion plating method, a CVD method, an MBE method and the like.

In addition, the order of forming each layers are not limited to the above-mentioned order.

Embodiment 6

Figure 6:
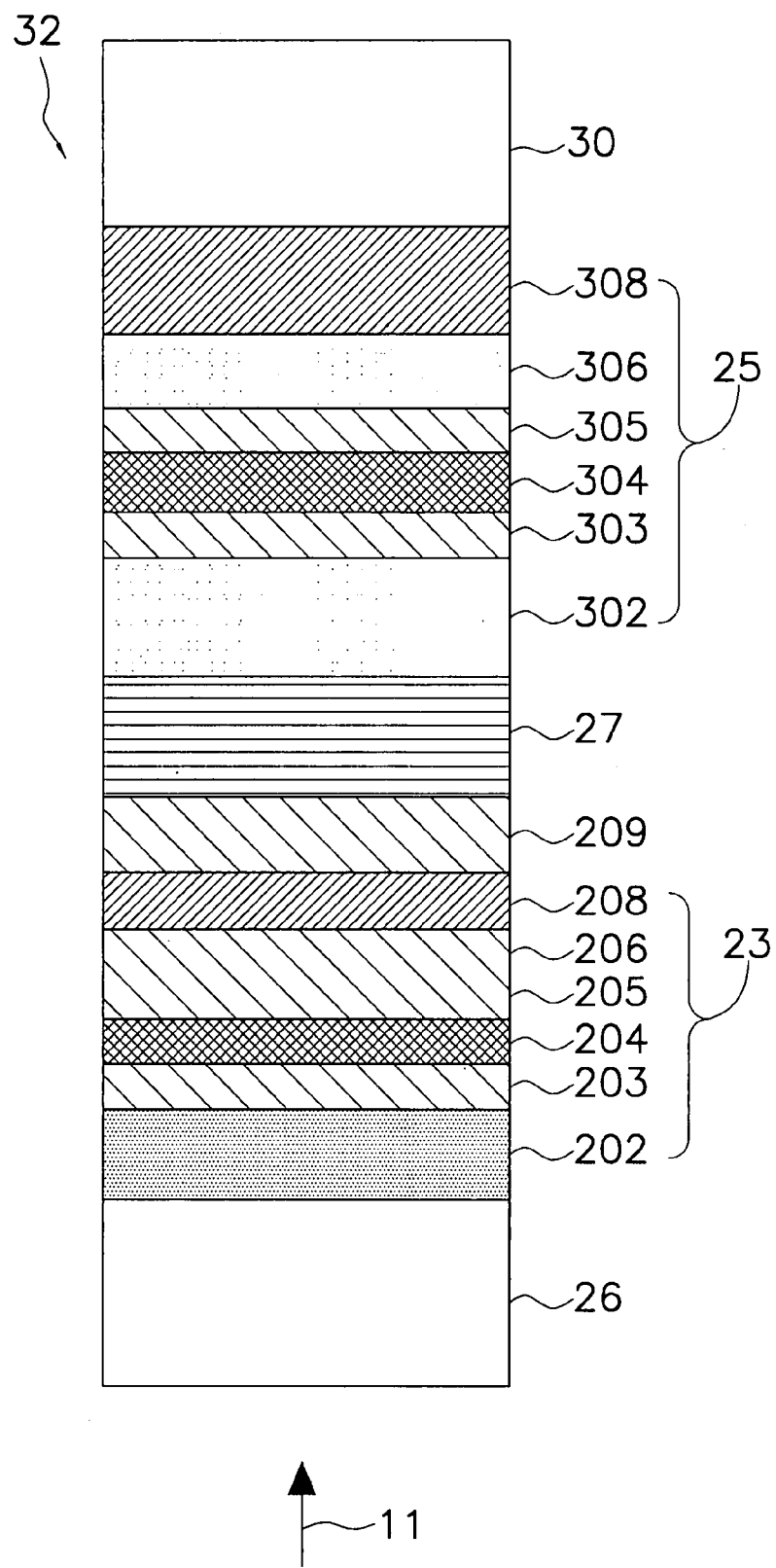
FIG. 6 is a cross-sectional diagram showing an example of a layer structure on an information recording medium comprising two information layers of the present invention.

In Embodiment 6, N=2 in the multilayer optical information recording medium of the present invention in Embodiment 5, in other words an example of an information recording medium constituted from biphasic information layers is explained. A partial cross-sectional diagram of information recording medium 32 of Embodiment 6 is shown in FIG. 6. Information recording medium 32 is a bilayer optical information recording medium wherein it is possible to record and/or reproduce information by means of irradiating with laser beam 11 from one side in substantially the same manner as for information recording medium 24 of Embodiment 3.

Information recording medium 32 is constituted from first information layer 23 on substrate 26 and second information layer 25 on substrate 30 bonded together through adhesive layer 27.

Depending on the requirements, a guide groove for guiding a laser beam can be formed on the surface of the second reflecting layer 308 side of substrate 30. It is preferable for the surfaces of substrate 30, which is the opposite side of second reflecting layer 308 side, to be smooth.

In addition, where a component is identified by the same symbol as was used in Embodiment 3, Embodiment 4 and Embodiment 5, it will be omitted from the explanation.

Information recording medium 32 can be manufactured by the method explained below.

First information layer 23 is first formed over substrate 26 (of thickness 0.6 mm, for example) in substantially the same manner as in Embodiment 5.

Furthermore, after adjustable transmittance layer 209 is formed, depending on the requirements, an initialization process can be carried out in which the entire first recording layer 204 is crystallized. The crystallization of first recording layer 204 can be carried out by irradiating with a laser beam.

Additionally, second information layer 25 is formed over substrate 30 (of thickness 0.6 mm, for example). At this time, if a guide groove for the purpose of guiding laser beam 11 is to be formed on substrate 30, second reflective layer 25 is formed on the side where the guide groove is formed. Specifically, substrate 30 is positioned within a coating apparatus, and second reflective layer 308, second dielectric layer 306, second interface layer 305, second recording layer 304, first interface layer 303 and first dielectric layer 302 are laminated on sequentially. Moreover, depending on the requirements, an interface layer can be formed between second reflective layer 308 and second dielectric layer 306. The methods for forming the films of the various layers are substantially the same as in Embodiment 3.

Furthermore, after first dielectric layer 302 is formed, depending on the requirements, an initialization process can be carried out in which the entire second recording layer 304 is crystallized. The crystallization of second recording layer 304 can be carried out by irradiating with laser beam.

Finally, substrate 26 laminated with first information layer 23 and substrate 30 laminated with second information layer 25 are bonded together through adhesive layer 27. Specifically, a resin such as a photocurable resin (particularly an ultra violet radiation-curable resin) or a slow-acting resin is applied over first information layer 23 or second information layer 25, and after substrate 26 and substrate 30 have been bonded together and spin coated, the resin can be cured. Moreover, an adhesive resin can be uniformly applied over first information layer 23 or second information layer 25 beforehand, and substrate 26 and substrate 30 can be bonded together.

In addition, depending on the requirements, an initialization process can be carried out in which the entire second recording layer 304 and first recording layer 204 are crystallized. In this case, based on substantially the same reasoning as in Embodiment 3, it is preferable for second recording layer 304 to be crystallized first.

Information recording medium 32 can be manufactured in the above manner. Furthermore, while each of the layers is formed by using the sputtering method in the present embodiment, the embodiment is not limited to this method and it is also possible to use a vacuum deposition method, an ion plating method, a CVD method, an MBE method and the like.

In addition, the order of forming each layers are not limited to the above-mentioned order:

Embodiment 7

The recording and reproducing methods for the information recording media of the present invention explained in Embodiments 1 to 3 are explained in Embodiment 7.

Figure 7:
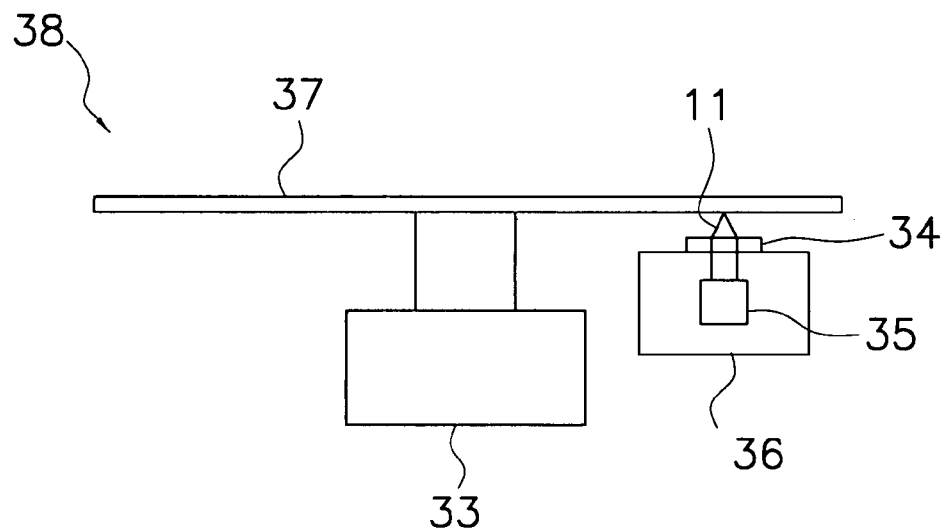
FIG. 7 is a pattern diagram showing a portion of a structure of a recording and reproducing apparatus used for recording and reproducing an information recording medium of the present invention.

A portion of the constitution of recording and reproducing apparatus 38 used in the recording and reproducing methods of the present invention is shown schematically in FIG. 7. Recording and reproducing apparatus 38 is provided with optical head 36 that is equipped with spindle motor 33 for rotating information recording apparatus 37, semiconductor laser 35 and objective lens 34 for focusing laser beam 11 that is output from semiconductor laser 35. Information recording medium 37 is the information recording medium explained in Embodiments 1 to 3, and is provided with single information layers (for example, information layer 16) or multiple information layers (for example, first information layer 23, second information layer 25). Objective lens 34 focuses laser beam 11 on an information layer.

The recording, erasing and overwriting of information on the information recording medium is carried out by modulating the power of laser beam 11, with a high power peak power ($P_p$ (mW)) and a low power bias power ($P_b$ (mW)). By irradiating with laser beam 11 at peak power, an amorphous phase is formed in a localized portion of the recording layer, and this amorphous phase becomes the recording mark. Between recording marks, irradiation at the bias power of laser beam 11 forms a crystalline phase (erased portion). Furthermore, when laser beam 11 at peak power is irradiated, laser beam 11 generally forms a pulse sequence, which is referred to as a multipulse. Furthermore, the multipulse can be modulated only with power levels of the peak power and the bias power, or with power level within the range of 0 mW to the peak power.

Additionally, at the power level lower than both the peak power and the bias power there will be no effect on the optical functioning of the recording mark due to irradiation with laser beam 11, while the power obtained as a sufficient amount of reflected light in order to reproduce the recording marks from the information recording medium is the reproducing power ($P_r$(mW)), and by reproducing the signal in a detector from the information recording medium obtained by irradiating with laser beam 11 at reproducing power, reproducing of the information signal can be performed.

In order to adjust the laser beam spot diameter within the range of 0.4 µm to 0.7 µm, the numerical aperture (NA) of objective lens 34 is preferably within the range of 0.5 to 1.1, more preferably within the range of 0.6 to 0.9. The wavelength of laser beam 11 is preferably ≦450 nm (more preferably, within the range of 350 nm to 450 nm). For the crystallization not to occur readily using the reproducing light and to obtain sufficient erasure performance, the linear information recording speed for the information recording medium is preferably within the range of 1 m/sec to 20 m/sec (more preferably, within the range of 2 m/sec to 15 m/sec).

For information recording media 24 and 32 that are provided with two information layers, the focal point of laser beam 11 contacts first recording layer 204 when recording onto first information layer 23, and information is recorded to first recording layer 204 with laser beam 11 passing through transparent layer 13. Reproducing from first recording layer 204 is carried out by using laser beam 11 that is reflected by first recording layer 204 and passes through transparent layer 13. When recording to second information layer 25, the focal point of laser beam 11 contacts second recording layer 304, and information is recorded to second information layer 25 with laser beam 11 passing through transparent layer 13, first information layer 23, and optical separation layer 17. Reproducing from second recording layer 25 is carried out by using laser beam 11 that is reflected by second recording layer 304 and passes through optical separation layer 17, first information layer 23 and transparent layer 13.

Furthermore, when a guide groove for guiding laser beam 11 is formed in substrate 14, or optical separation layers 20, 19 or 17, information can be recorded on the side of the surface groove proximal to the laser beam 11 incident side (groove) or on the distal side of the surface groove (land). Additionally, information can be recorded on both the groove and the land.

For the recording capability, the power of laser beam 11 is modulated between 0 to $P_p$ (mW), and by the (1-7) modulation method, random signals from a mark length of 0.149 µm (2T) to 0.596 µm (8T) are recorded, and recording mark front end and tail end jitter (mark position error) can be evaluated by measuring with a time interval analyzer. Here, the smaller the jitter value, the better recording performance. Moreover, $P_p$ and $P_b$ determined the minimization of the average values for the front end and tail end jitter (average jitter). This gives the $P_p$ most suitable for recording sensitivity.

Furthermore, the repeat overwrite cycle number was evaluated, with the power of laser beam 11 modulated between 0 and $P_p$ (mW), random signals for mark lengths from 0.149 µm (2T) to 0.596 µm (8T) were recorded continuously, and in each recorded overwrite cycle the front end and tail end jitter were measured with a time interval analyzer. The upper limiting value for the repeat overwriting cycle number was a 3% increase with respect to the front end and tail end average jitter values over one cycle. Here, the $P_p$ and $P_b$ determined how the average jitter values were minimized.

In addition, the signal storage stability was evaluated, with the power of laser beam 11 modulated between 0 and $P_p$ (mW), random signals for mark lengths from 0.149 µm (2T) to 0.596 µm (8T) were recorded on the grooves, carried out an accelerated test under an 20% RH environment at 80° C. for 100 h, and the amount of jitter change ((jitters after the acceleration)-(jitters before the acceleration)) after the test was evaluated. Here, $P_p$ and $P_b$ are determined so as to minimize average jitter values, and each of marks recorded for 10, 100 and 1000 times were evaluated.

Embodiment 8

The recording and reproducing methods for the information recording media of the present invention explained in Embodiments 4 to 6 are explained in Embodiment 8.

A portion of the constitution of recording and reproducing apparatus 38 used in the recording and reproducing methods of the present invention is the same as Embodiment 7 and is shown schematically in FIG. 7. Here, where there are the same explanations appeared in Embodiment 7, they will be omitted. Information recording medium 37 is the information recording medium explained in Embodiments 4 to 6, and is provided with single information layers (for example, information layer 16) or multiple information layers (for example, first information layer 23, second information layer 25).

In order to adjust the laser beam spot diameter within the range of 0.4 µm to 0.7 µm, the numerical aperture (NA) of objective lens 34 is preferably within the range of 0.5 to 1.1, more preferably within the range of 0.6 to 0.9. The wavelength of laser beam 11 is preferably ≦700 nm (more preferably, within the range of 600 nm to 700 nm). For the crystallization not to occur readily using the reproducing light and to obtain sufficient erasure performance, the linear information recording speed for the information recording medium is preferably within the range of 1 m/sec to 20 m/sec (more preferably, within the range of 2 m/sec to 15 m/sec).

Furthermore, when a guide groove for guiding laser beam 11 is formed in substrate 14, or optical separation layers 20, 19 or 17, information can be recorded on the side of the surface groove proximal to the laser beam 11 incident side (groove) or on the distal side of the surface groove (land). Additionally, information can be recorded on both the groove and the land.

For the recording capability, the power of laser beam 11 is modulated between 0 to $P_p$ (mW), random signals from a mark length of 0.40 µm (3T) to 1.47 µm (11T) are recorded, and recording mark front end and tail end jitter (mark position error) can be evaluated by measuring with a time interval analyzer. Here, the smaller the jitter value, the better recording performance. Moreover, $P_p$ and $P_b$ determined the minimization of the average values for the front end and tail end jitter (average jitter). This gives the $P_p$ most suitable for recording sensitivity.

Furthermore, the repeat overwrite cycle number was evaluated, with the power of laser beam 11 modulated between 0 and $P_p$ (mW), random signals for mark lengths from 0.40 µm (3T) to 1.47 µm (11T) were recorded continuously, and in each recorded overwrite cycle the front end and tail end jitter were measured with a time interval analyzer. The upper limiting value for the repeat overwriting cycle number was a 3% increase with respect to the front end and tail end average jitter values over one cycle. Here, the $P_p$ and $P_b$ determined such that the average jitter values were minimized.

The signal storage stability was evaluated, with the power of laser beam 11 modulated between 0 and $P_p$ (mW), random signals for mark lengths from 0.149 µm (2T) to 0.596 µm (8T) were recorded on the groove, carried out an accelerated test under an 20% RH environment at 80° C. for 100 h, and the amount of jitter deterioration (the amount of archival deterioration) after the test was evaluated. Here, $P_p$ and $P_b$ are determined so as to minimize average jitter values, and each of marks recorded for 10, 100 and 1000 times were evaluated.

Embodiment 9

Figure 8:
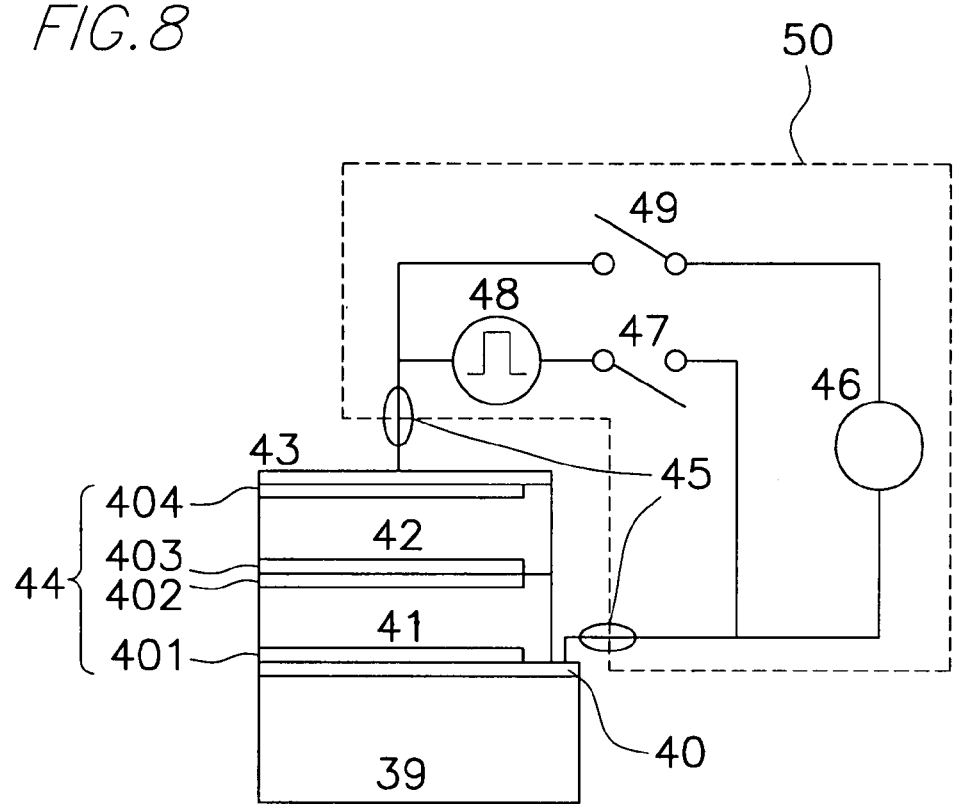
FIG. 8 is a pattern diagram showing portions of structures of an information recording medium and an electrical information recording and reproducing apparatus of the present invention.

An example of an information recording medium of the present invention is explained in Embodiment 9. One example of a configuration for an electrical information recording medium 44 of Embodiment 9 is shown in FIG. 8. Electrical information recording medium 44 is an information recording medium wherein it is possible to record and/or reproduce information by means of applying electrical energy, particularly an electric current.

A resin substrate such as of polycarbonate and the like, a glass substrate, a ceramic substrate such as of $Al_2O_3$ and the like, various semiconductor substrates such as of Si, and various metal substrates such as of Cu can be used for substrate 39. The case of an Si substrate will be explained here. Electrical information recording medium 44 is formed by sequential lamination of lower electrode 40, first interface layer 401, first recording layer 41, second interface layer 402, third interface layer 403, second recording layer 42, fourth interface layer 404 and upper electrode 43. Lower electrode 40 and upper electrode 43 are formed in order to apply an electric current to first recording layer 41 and second recording layer 42. Here, first interface layer 401 and second interface layer 402 are established to adjust the amount of crystallization time of first recording layer 41, and third interface layer 403 and fourth interface layer 404 are established to adjust the amount of crystallization time of second recording layer 42.

Substantially the same materials as were used for first interface layer 103 in Embodiment 1 can be used in first interface layer 401, second interface layer 402, third interface layer 403, forth interface layer 404.

Materials that undergo a reversible phase-change between the crystalline phase and the amorphous phase by means of Joule heating generated by the application of electrical current are used in first recording layer 41 and second recording layer 42, where the phenomenon of a change in electrical resistance between the crystalline phase and the amorphous phase is utilized to record information. The material used for first recording layer 41 can be substantially the same as that of first recording layer 204 of Embodiment 2, and the material used for second recording layer 42 can be substantially the same as that of second recording layer 304 of Embodiment 3.

First recording layer 41 and second recording layer 42 can be formed in substantially the same manner as first recording layer 204 of Embodiment 2 and second recording layer 304 of Embodiment 3, respectively.

In addition, simple metal materials such as Al, Au, Ag, Cu and Pt can be used for lower electrode 40 and upper electrode 43, as well as alloy materials that have one or a plurality of elements from among these as the chief components to which have been added one or a plurality of other elements that are suitable for increasing the moisture resistance as well as regulating the thermal conductivity and the like. Lower electrode 40 and upper electrode 43 can be formed under an Ar gas atmosphere by sputtering from a material that is a base metal or a base alloy. Here, the method used for forming the various layers can be a vacuum deposition method, an ion plating method, a CVD method, an MBE method and the like.

Electrical information recording medium 44 is electrically connected to electrical information recording and reproducing apparatus 50 through application unit 45. This electrical information recording and reproducing apparatus 50 is connected to pulse power source 48 by means of switch 47 in order to apply an electrical current pulse between lower electrode 40 and upper electrode 43 to first recording layer 41 and second recording layer 42. Additionally, in order to detect the resistance value due to the phase-changes in first recording layer 41 and second recording layer 42, resistance meter 46 is connected via switch 49 between lower electrode 40 and upper electrode 43. In order to change first recording layer 41 and second recording layer 42 from the amorphous phase (high resistance state) to the crystalline phase (low resistance state), switch 47 is closed (switch 49 is opened) to apply an electrical current pulse between the electrodes, and the temperature of the portion receiving the electrical current pulse will be higher than the crystallization temperature of the material and lower than the melting point, so that the crystallization time interval can be maintained. On returning from the crystalline phase to become amorphous again, an electrical current pulse that is relatively higher than during crystallization is applied for a shorter time, the temperature of the recording layer rises higher than the melting point and melts, after which it quickly cools. Furthermore, pulse power source 48 for electrical information recording and reproducing apparatus 50 can output the recording/erasing pulse waveforms shown in FIG. 11.

Here, the resistance value when first recording layer 41 is in the amorphous phase is $r_{a1}$, the resistance value when first recording layer 41 is in the crystalline phase is $r_{c1}$, the resistance value when second recording layer 42 is in the amorphous phase is $r_{a2}$, and the resistance value when second recording layer 42 is in the crystalline phase is $r_{c2}$. Here, with $r_{c1} \leq r_{c2} < r_{a1} < r_{a2}$ or $r_{c1} \leq r_{c2} < r_{a2} < r_{a1}$ or $r_{c2} \leq r_{c1} < r_{a1} < r_{a2}$ or $r_{c2} \leq r_{c1} < r_{a2} < r_{a1}$, four different values can be determined for the sums of the resistance values for first recording layer 41 and second recording layer 42 $r_{a1}+r_{a2}$, $r_{a1}+r_{c2}$, $r_{a2}+r_{c1}$ and $r_{c1}+r_{c2}$. Consequently, by measuring the resistance value for the electrode gap with resistance meter 46, four different statuses and thus two information values can be detected at one time.

Figure 9:
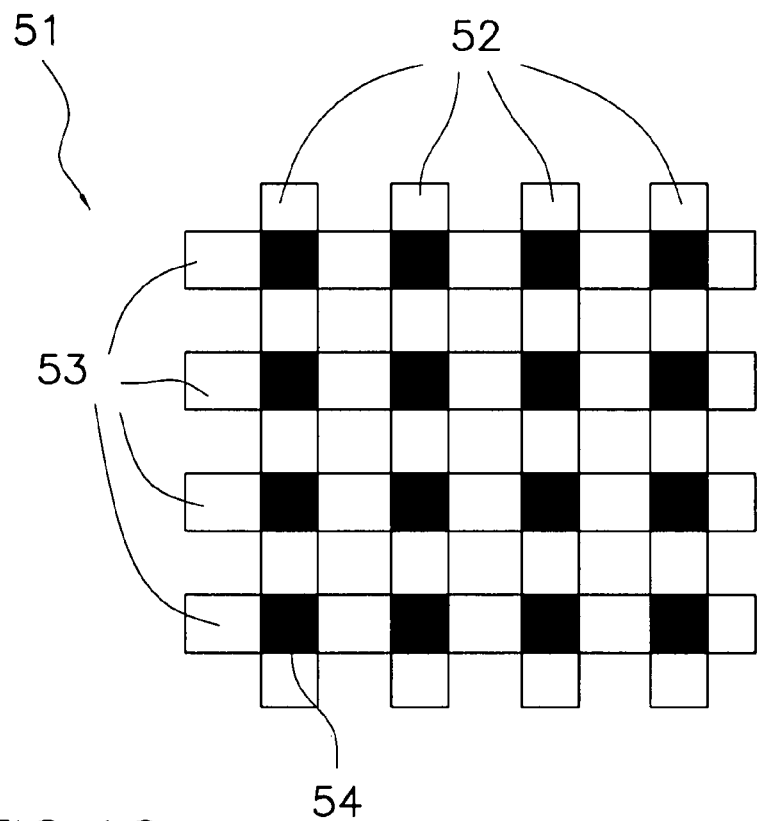
FIG. 9 is a pattern diagram showing a portion of a structure of a high capacity electrical information recording medium of the present invention.

As shown in FIG. 9, a high capacity electrical information recording medium 51 that is constituted from a plural arrangement of these electrical information recording media 44 in a matrix. In each memory cell 54, a configuration substantially the same as electrical information recording medium 44 is formed in a microscopic region. Information recording and reproducing operations can be carried out in the various memory cells 54 by designating one of them by the respective word line 52 and pit line 53.

Figure 10:
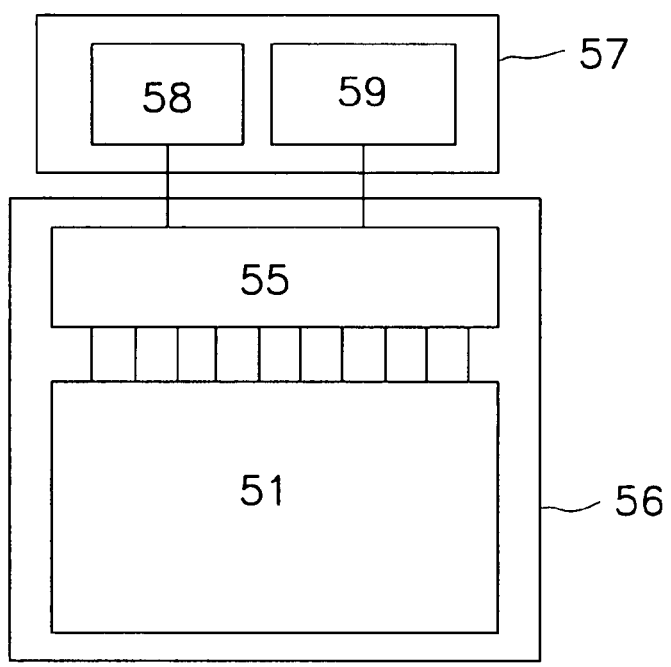
FIG. 10 is a pattern diagram showing portions of structures of an electrical information recording medium and a recording and reproducing system of the medium of the present invention.
Figure 12:
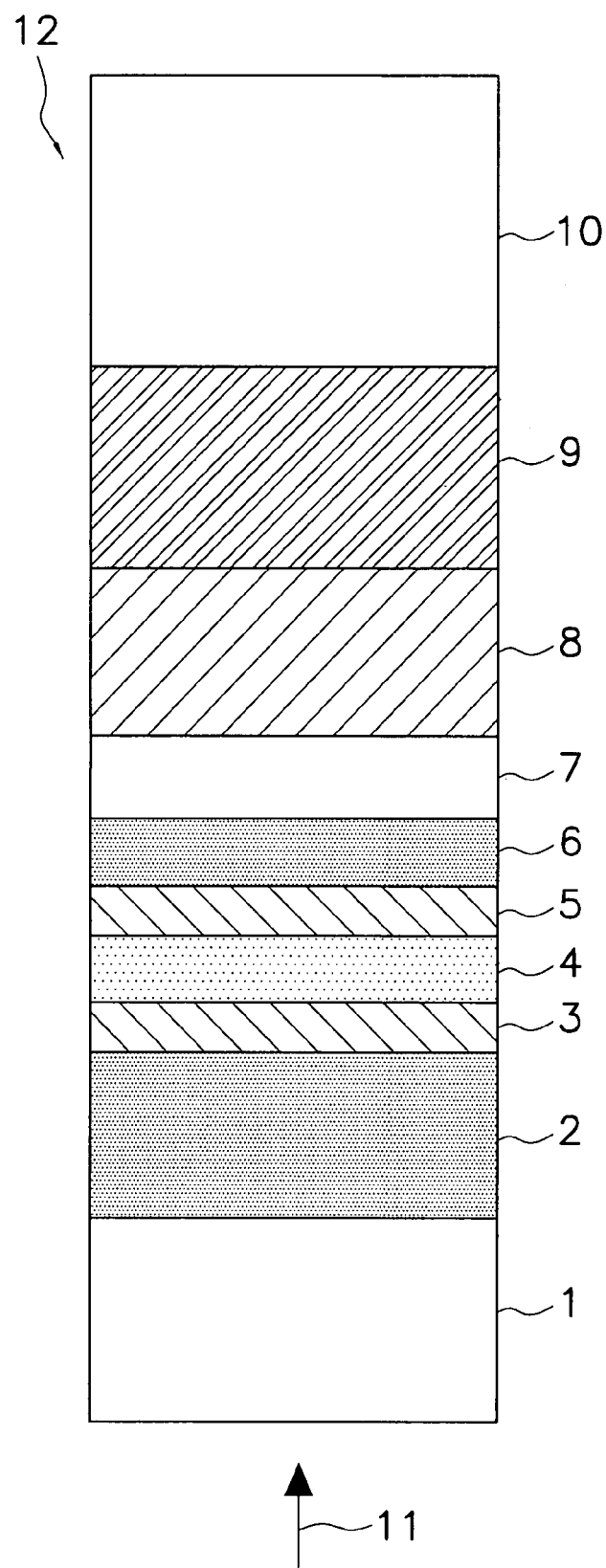
FIG. 12 is a cross-sectional diagram showing an example of a layer structure of a 4.7 GB/DVD-RAM.

Electrical information recording medium 51 is used in FIG. 10, which shows a configuration example of an information recording system. Storage apparatus 56 is constituted from electrical information recording medium 51 and address indicator circuit 55. By means of address indicator circuit 55, word line 52 and pit line 53 of electrical information recording medium 51 are indicated respectively, and information recording and reproducing operations can be carried out in each of the memory cells 54. Moreover, by means of an electrical connection from storage apparatus 56 to external circuit 57 that is constituted by at least pulse power source 58 and resistance meter 59, information recording and reproducing operations can be carried out to electrical information recording medium 51.

EXAMPLES

Specific modes to implement the present invention are explained in detail by using examples.

Example 1

In Example 1, information recording medium 15 of FIG. 1 was constructed and was examined with respect to the materials of first interface layer 103 and second interface layer 105, the recording sensitivity, the repeat overwriting capability, and signal storage stability of information layer 16. Specifically, information recording media 15 that includes information layers 16 with different materials for first interface layer 103 and second interface layer 105 were constructed, and the recording sensitivity, the repeat overwriting capability, and signal storage stability of information layers 16 were measured.

The samples were manufactured as described below. First, for substrate 14, polycarbonate substrates (diameter 120 mm, thickness 1.1 mm) were prepared and a guide groove (depth 20 nm, track pitch 0.32 μm) was formed for guiding laser beam 11. Next, the following were laminated on this polycarbonate substrate by the sequential sputtering method: an Ag—Pd—Cu layer (thickness: 80 nm) as reflective layer 108, a $Dy_2O_3$ layer (thickness: 15 nm), second interface layer 105 (thickness: 5 nm), a $Ge_{28}Sn_3Bi_2Te_{34}$ layer (thickness: 11 nm) as recording layer 104, second interface layer 103 (thickness: 5 nm), and a $(ZnS)_{80}(SiO_2)_{20}$ layer (thickness: 58 nm) as first dielectric layer 102.

Finally, an ultra violet radiation-curable resin was applied over first dielectric layer 102, and after a uniform resin layer was formed by bonding polycarbonate (diameter 120 mm, thickness 90 μm) to first dielectric layer 102 and rotating, a 100 μm thick transparent layer 13 was formed by curing the resin with ultra violet radiation. Later, an initialization process was carried out in which recording layer 104 was crystallized with a laser beam. As mentioned above, a plurality of information recording media of different materials for first interface layer 103 and second interface layer 105 were manufactured.

With the samples obtained in this manner, the recording sensitivity of information layer 16 of information recording medium 15 and the repeat overwriting capability were tested using the recording and reproducing apparatus 38 in FIG. 7. In this case, the wavelength of laser beam 11 was 405 nm, numerical aperture (NA) of objective lens 34 was 0.85, the sample linear speeds during measurement were 4.9 m/sec and 9.8 m/sec, and the shortest mark length (2T) was 0.149 μm. Additionally, the information was recorded on the groove. An accelerated test for the evaluation of the signal storage stability was carried out in a thermostatic chamber under a humidity of 20% RH environment at 80° C. for 100 h.

Results are shown for the evaluation of materials of first interface layer 103 and second interface layer 105 of information layer 16 of information recording medium 15, and the recording sensitivity and the repeat overwriting capability of information layer 16, in Table 1 for the linear speed of 4.9 m/sec (1×), in Table 2 for the linear speed of 9.8 m/sec (2×) and in Table 3 for the signal storage stability. Here, Zr—In—O in the Tables represent $(ZrO_2)_{50}(In_2O_3)_{50}$, Zr—Cr—O represent $(ZrO_2)_{50}(Cr_2O_3)_{50}$, respectively. Here, for the recording sensitivity at 1×, <6.0 mW is indicated by ○, ≧6.0 mW and <7.0 mW is indicated by Δ, and ≧7.0 mW is indicated by x. Moreover, for the recording sensitivity at 2×, <6.5 mW is indicated by ○, ≧6.5 mW and <7.5 mW is indicated by Δ, and ≧7.5 mW is indicated by x. Also, for the repeat overwriting capability, a repeat overwriting cycle number of ≧7000 is indicated by θ, a ≧4000 but <7000 is indicated by ○, a ≧1000 but <4000 is indicated by Δ, and ≦1000 is indicated by x. For the signal storage stability of recording marks recorded for 10, 100 and 1000 times, maximum values of the amount of archival deterioration at ≧0% and <2% is indicated by ○, ≧2% and <3% is indicated by Δ, ≧3% is indicated by x.

TABLE 1

| Sample No. | Material of first interface layer 103 | Material of second interface layer 105 | recording sensitivity | repeat overwriting capability |
|---|---|---|---|---|
| 1-1 | Ge—N | Ge—N | Δ | X |
| 1-2 | Zr—Cr—O | Zr—Cr—O | Δ | θ |
| 1-3 | Zr—In—O | Zr—In—O | ○ | Δ |

TABLE 1-continued

| Sample No. | Material of first interface layer 103 | Material of second interface layer 105 | recording sensitivity | repeat overwriting capability |
|---|---|---|---|---|
| 1-4 | Zr—In—O | Zr—Cr—O | ◯ | ◯ |
| 1-5 | Zr—Cr—O | Zr—In—O | ◯ | θ |

TABLE 2

| Sample No. | Material of first interface layer 103 | Material of second interface layer 105 | recording sensitivity | repeat overwriting capability |
|---|---|---|---|---|
| 1-1 | Ge—N | Ge—N | Δ | X |
| 1-2 | Zr—Cr—O | Zr—Cr—O | Δ | θ |
| 1-3 | Zr—In—O | Zr—In—O | ◯ | Δ |
| 1-4 | Zr—In—O | Zr—Cr—O | ◯ | ◯ |
| 1-5 | Zr—Cr—O | Zr—In—O | ◯ | θ |

TABLE 3

| Sample No. | Material of first interface layer 103 | Material of second interface layer 105 | signal storage stability |
|---|---|---|---|
| 1-2 | Zr—Cr—O | Zr—Cr—O | X |
| 1-3 | Zr—In—O | Zr—In—O | ◯ |
| 1-4 | Zr—In—O | Zr—Cr—O | ◯ |
| 1-5 | Zr—Cr—O | Zr—In—O | ◯ |

For these results, for Sample No. 1-1 used Ge—N for first interface layer 103 and second interface layer 105, the repeat overwriting capability at 1× was seen to be poor. For Sample No. 1-2 used for $(ZrO_2)_{50}(Cr_2O_3)_{50}$ for first interface layer 103 and second interface layer 105, the amount of archival deterioration is large and the signal storage stability was seen to be poor. For Sample No. 1-3, 1-4 and 1-5, the recording sensitivity, the repeat overwriting capability and the signal storage stability were favorable. Among these, particularly for Sample No. 1-5 used $(ZrO_2)_{50}(Cr_2O_3)_{50}$ for first interface layer 103 and used $(ZrO_2)_{50}(In_2O_3)_{50}$ for second interface layer 105, the recording sensitivity, the repeat overwriting capability and the signal storage stability were all highly favorable.

Also, for the structure of Sample No. 1-5, as a composition ratio of $ZrO_2$ and $Cr_2O_3$ in first interface layer 103 and a composition ratio of $ZrO_2$ and $In_2O_3$ in second interface layer 105 is changed, the recording sensitivity, the repeat overwriting capability and the signal storage stability for the linear speed of 1× and 2× were evaluated. Here, x1 is for $(ZrO_2)_{100-x1}(Cr_2O_3)_{x1}$ (provided that 0<x1<100), and y1 is for $(ZrO_2)_{100-y1}(In_2O_3)_{y1}$ (provided that 0<y1<100), and the values of x1 and y1 are changed. Results are shown in Table 4 for 1×, in Table 5 for 2× and in Table 6 for the signal storage stability.

TABLE 4

| Sample No. | material composition of first interface layer 103 (x1 value) | material composition of second interface layer 105 (y1 value) | recording sensitivity | repeat overwriting capability |
|---|---|---|---|---|
| 1-1 | Ge—N | Ge—N | Δ | X |
| 1-5 | 50 | 50 | ◯ | θ |
| 1-6 | 20 | 50 | ◯ | Δ |

TABLE 4-continued

| Sample No. | material composition of first interface layer 103 (x1 value) | material composition of second interface layer 105 (y1 value) | recording sensitivity | repeat overwriting capability |
|---|---|---|---|---|
| 1-7 | 35 | 50 | ◯ | θ |
| 1-8 | 65 | 50 | ◯ | θ |
| 1-9 | 80 | 50 | Δ | θ |
| 1-10 | 50 | 20 | Δ | θ |
| 1-11 | 50 | 35 | ◯ | θ |
| 1-12 | 50 | 65 | ◯ | θ |
| 1-13 | 50 | 80 | Δ | ◯ |

TABLE 5

| Sample No. | material composition of first interface layer 103 (x1 value) | material composition of second interface layer 105 (y1 value) | recording sensitivity | repeat overwriting capability |
|---|---|---|---|---|
| 1-1 | Ge-N | Ge-N | Δ | X |
| 1-5 | 50 | 50 | ◯ | θ |
| 1-6 | 20 | 50 | ◯ | Δ |
| 1-7 | 35 | 50 | ◯ | θ |
| 1-8 | 65 | 50 | ◯ | θ |
| 1-9 | 80 | 50 | Δ | θ |
| 1-10 | 50 | 20 | Δ | θ |
| 1-11 | 50 | 35 | ◯ | θ |
| 1-12 | 50 | 65 | ◯ | θ |
| 1-13 | 50 | 80 | Δ | ◯ |

TABLE 6

| Sample No. | material composition of first interface layer 103 (x1 value) | material composition of second interface layer 105 (y1 value) | signal storage stability |
|---|---|---|---|
| 1-5 | 50 | 50 | ◯ |
| 1-6 | 20 | 50 | ◯ |
| 1-7 | 35 | 50 | ◯ |
| 1-8 | 65 | 50 | ◯ |
| 1-9 | 80 | 50 | Δ |
| 1-10 | 50 | 20 | Δ |
| 1-11 | 50 | 35 | ◯ |
| 1-12 | 50 | 65 | ◯ |
| 1-13 | 50 | 80 | ◯ |

For these results, all Samples showed the favorable characteristics that exceed the results of Sample No. 1-1. Particularly, since Sample No. 1-5, 1-7, 1-8, 1-11, and 1-12 showed the more favorable characteristics, conditions of 20<x1<80 and 20<y1<80 are more preferable for the material composition of the interface layer.

Example 2

In Example 2, information recording medium 24 of FIG. 3 was constructed and was examined with respect to the materials of first interface layer 303 and second interface layer 305, the recording sensitivity, the repeat overwriting capability, and signal storage stability of second information layer 25. Specifically, information recording media 24 that includes second information layers 25 with different materials for first interface layer 303 and second interface layer 305 were constructed, and the recording sensitivity, the repeat overwriting capability, and signal storage stability of second information layers 25 were measured.

The samples were manufactured as described below. First, for substrate 14, polycarbonate substrates (diameter 120 mm, thickness 1.1 mm) were prepared and a guide groove (depth 20 nm, track pitch 0.32 μm) was formed for guiding laser beam 11. Next, the following were laminated on this polycarbonate substrate by the sequential sputtering method: an Ag—Pd—Cu layer (thickness: 80 nm) as second reflective layer 308, a $Dy_2O_3$ layer (thickness: 15 nm) as second dielectric layer 306, second interface layer 305 (thickness: 5 nm), a $Ge_{28}Sn_3Bi_2Te_{34}$ layer (thickness: 10 nm) as second recording layer 304, first interface layer 303 (thickness: 5 nm), and a $(ZnS)_{80}(SiO_2)_{20}$ layer (thickness: 60 nm) as first dielectric layer 302.

Next, an ultra violet radiation-curable resin was applied over first dielectric layer 302, and after a uniform resin layer was formed by covering and bonding substrate, on which a guide groove (depth 20 nm, track pitch 0.32 μm) was formed, on first dielectric layer 302, the resin was cured. Then, substrate was peeled. By these processes, optical separation layer 17 with thickness of 25 μm was formed, on which the guide groove leading laser beam 11 was formed at the side of first information layer 23.

After this, the following were laminated on this optical separation layer 17 by the sequential sputtering method: a $TiO_2$ layer (thickness: 20 nm) as adjustable transmittance layer 209, an Ag—Pd—Cu layer (thickness: 10 nm) as first reflective layer 208, an $(ZrO_2)_{25}(SiO_2)_{25}(In_2O_3)_{50}$ layer (thickness: 10 nm) as fourth interface layer 205, a $Ge_{28}Sn_3Bi_2Te_{34}$ layer (thickness: 6 nm) as first recording layer 204, an $(ZrO_2)_{25}(SiO_2)_{25}(Cr_2O_3)_{50}$ layer (thickness: 5 nm) as third interface layer 203, and a $(ZnS)_{80}(SiO_2)_{20}$ layer (thickness: 40 nm) as third dielectric layer 202.

Finally, an ultra violet radiation-curable resin was applied over third dielectric layer 202, and after a uniform resin layer was formed by bonding polycarbonate (diameter 120 mm, thickness 65 μm) to third dielectric layer 202 and rotating, a 75 μm thick transparent layer 13 was formed by curing the resin with ultra violet radiation. Later, an initialization process was carried out in which second recording layer 304 and first recording layer 204 were crystallized with a laser beam. As mentioned above, a plurality of information recording media of different materials for first interface layer 303 and second interface layer 305 were manufactured.

With the samples obtained in this manner, the recording sensitivity, the repeat overwriting capability and the signal storage stability of second information layer 25 of information recording medium 24 were tested using the recording and reproducing apparatus 38 in FIG. 7. In this case, the wavelength of laser beam 11 was 405 nm, numerical aperture (NA) of objective lens 34 was 0.85, the sample linear speeds during measurement were 4.9 m/sec and 9.8 m/sec, and the shortest mark length (2T) was 0.149 μm. Additionally, information is recorded on the groove.

Results are shown for the evaluation of materials of first interface layer 303 and second interface layer 305 of second information layer 25 of information recording medium 24, and the recording sensitivity and the repeat overwriting capability of second information layer 25, in Table 7 for the linear speed of 4.9 m/sec (1×), in Table 8 for the linear speed of 9.8 m/sec (2×) and in Table 9 for the signal storage stability. Here, Zr—In—O in the Tables represent $(ZrO_2)_{50}(In_2O_3)_{50}$, Zr—Cr—O represent $(ZrO_2)_{50}(Cr_2O_3)_{50}$, respectively. Here, for the recording sensitivity at 1×, <12 mW is indicated by ○, ≧12 mW and <13 mW is indicated by Δ, and ≧13 mW is indicated by x. Also, for the recording sensitivity at 2×, <13 mW is indicated by ○, ≧13 mW and <14 mW is indicated by Δ, and ≧14 mW is indicated by x. For the repeat overwriting capability, a repeat overwriting cycle number of ≧7000 is indicated by θ, a ≧4000 but <7000 is indicated by ○, a ≧1000 but <4000 is indicated by Δ, and ≦1000 is indicated by x. For the signal storage stability of recording marks recorded for 10, 100 and 1000 times, maximum values of the amount of archival deterioration at ≧0% and <2% is indicated by ○, ≧2% and <3% is indicated by Δ, ≧3% is indicated by x.

TABLE 7

| Sample No. | Material of first interface layer 303 | Material of second interface layer 305 | recording sensitivity | repeat overwriting capability |
|---|---|---|---|---|
| 2-1 | Ge—N | Ge—N | Δ | X |
| 2-2 | Zr—Cr—O | Zr—Cr—O | Δ | θ |
| 2-3 | Zr—In—O | Zr—In—O | ○ | Δ |
| 2-4 | Zr—In—O | Zr—Cr—O | ○ | ○ |
| 2-5 | Zr—Cr—O | Zr—In—O | ○ | θ |

TABLE 8

| Sample No. | Material of first interface layer 303 | Material of second interface layer 305 | recording sensitivity | repeat overwriting capability |
|---|---|---|---|---|
| 2-1 | Ge—N | Ge—N | Δ | X |
| 2-2 | Zr—Cr—O | Zr—Cr—O | Δ | θ |
| 2-3 | Zr—In—O | Zr—In—O | ○ | Δ |
| 2-4 | Zr—In—O | Zr—Cr—O | ○ | ○ |
| 2-5 | Zr—Cr—O | Zr—In—O | ○ | θ |

TABLE 9

| Sample No. | Material of first interface layer 303 | Material of second interface layer 305 | signal storage stability |
|---|---|---|---|
| 2-2 | Zr—Cr—O | Zr—Cr—O | X |
| 2-3 | Zr—In—O | Zr—In—O | ○ |
| 2-4 | Zr—In—O | Zr—Cr—O | ○ |
| 2-5 | Zr—Cr—O | Zr—In—O | ○ |

For these results, for Sample No. 2-1 used Ge—N for first interface layer 303 and second interface layer 305, the repeat overwriting capability at 1× was seen to be poor. For Sample No. 2-2 used for $(ZrO_2)_{50}(Cr_2O_3)_{50}$ for first interface layer 103 and second interface layer 105, the amount of archival deterioration is large and the signal storage stability was seen to be poor. For Sample No. 2-3, 2-4 and 2-5, the recording sensitivity, the repeat overwriting capability and the signal storage stability were favorable. Among these, particularly for Sample No. 2-5 used $(ZrO_2)_{50}(Cr_2O_3)_{50}$ for first interface layer 303 and used $(ZrO_2)_{50}(In_2O_3)_{50}$ for second interface layer 305, the recording sensitivity, the repeat overwriting capability and the signal storage stability were all highly favorable.

Also, for the structure of Sample No. 2-5, as a composition ratio of $ZrO_2$ and $Cr_2O_3$ in first interface layer 303 and a composition ratio of $ZrO_2$ and $In_2O_3$ in second interface layer 305 is changed, the recording sensitivity, the repeat overwriting capability and the signal storage stability for the linear speed of 1× and 2× were evaluated. Here, x1 is for $(ZrO_2)_{100-x2}(Cr_2O_3)_{x2}$ (provided that 0<x2<100), and y2 is for $(ZrO_2)_{100-y2}(In_2O_3)_{y2}$ (provided that 0<y2<100), and the values of x2 and y2 are changed. Results are shown in Table 10 for 1×, in Table 11 for 2× and in Table 12 for the signal storage stability.

TABLE 10

| Sample No. | material composition of first interface layer 303 (x2 value) | material composition of second interface layer 305 (y2 value) | recording sensitivity | repeat overwriting capability |
|---|---|---|---|---|
| 2-1 | Ge—N | Ge—N | Δ | X |
| 2-5 | 50 | 50 | ◯ | θ |
| 2-6 | 20 | 50 | ◯ | Δ |
| 2-7 | 35 | 50 | ◯ | θ |
| 2-8 | 65 | 50 | ◯ | θ |
| 2-9 | 80 | 50 | Δ | θ |
| 2-10 | 50 | 20 | Δ | θ |
| 2-11 | 50 | 35 | ◯ | θ |
| 2-12 | 50 | 65 | ◯ | θ |
| 2-13 | 50 | 80 | Δ | ◯ |

TABLE 11

| Sample No. | material composition of first interface layer 303 (x2 value) | material composition of second interface layer 305 (y2 value) | recording sensitivity | repeat overwriting capability |
|---|---|---|---|---|
| 2-1 | Ge—N | Ge—N | Δ | X |
| 2-5 | 50 | 50 | ◯ | θ |
| 2-6 | 20 | 50 | ◯ | Δ |
| 2-7 | 35 | 50 | ◯ | θ |
| 2-8 | 65 | 50 | ◯ | θ |
| 2-9 | 80 | 50 | Δ | θ |
| 2-10 | 50 | 20 | Δ | θ |
| 2-11 | 50 | 35 | ◯ | θ |
| 2-12 | 50 | 65 | ◯ | θ |
| 2-13 | 50 | 80 | Δ | ◯ |

TABLE 12

| Sample No. | material composition of first interface layer 303 (x2 value) | material composition of second interface layer 305 (y2 value) | signal storage stability |
|---|---|---|---|
| 2-5 | 50 | 50 | ◯ |
| 2-6 | 20 | 50 | ◯ |
| 2-7 | 35 | 50 | ◯ |
| 2-8 | 65 | 50 | ◯ |
| 2-9 | 80 | 50 | Δ |
| 2-10 | 50 | 20 | Δ |
| 2-11 | 50 | 35 | ◯ |
| 2-12 | 50 | 65 | ◯ |
| 2-13 | 50 | 80 | ◯ |

For these results, all Samples showed the favorable characteristics that exceed the results of Sample No. 1-1. Particularly, since Sample No. 2-5, 2-7, 2-8, 2-11, and 2-12 showed the more favorable characteristics, conditions of $20<x2<80$ and $20<y2<80$ are more preferable for the material composition of the interface layer.

Example 3

In Example 3, information recording medium 24 of FIG. 3 was constructed and was examined with respect to the materials of third interface layer 203 and forth interface layer 205, the recording sensitivity, the repeat overwriting capability, and signal storage stability of first information layer 23. Specifically, information recording media 24 that include first information layers 23 with different materials for third interface layer 203 and forth interface layer 205 were constructed, and the recording sensitivity, the repeat overwriting capability, and signal storage stability of first information layers 23 were measured.

The samples were manufactured as described below. First, for substrate 14, polycarbonate substrates (diameter 120 mm, thickness 1.1 mm) were prepared and a guide groove (depth 20 nm, track pitch 0.32 μm) was formed for guiding laser beam 11. Next, the following were laminated on this polycarbonate substrate by the sequential sputtering method: an Ag—Pd—Cu layer (thickness: 80 nm) as second reflective layer 208, a $Dy_2O_3$ layer (thickness: 15 nm) as second dielectric layer 306, a $(ZrO_2)_{25}(SiO_2)_{25}(In_2O_3)_{50}$ layer (thickness: 5 nm) as second interface layer 305, a $Ge_{28}Sn_3Bi_2Te_{34}$ layer (thickness: 10 nm) as second recording layer 304, a $(ZrO_2)_{25}(SiO_2)_{25}(Cr_2O_3)_{50}$ layer as first interface layer 303 (thickness: 5 nm), and a $(ZnS)_{80}(SiO_2)_{20}$ layer (thickness: 60 nm) as first dielectric layer 302.

Next, an ultra violet radiation-curable resin was applied over first dielectric layer 302, and after a uniform resin layer was formed by covering and bonding substrate, on which a guide groove (depth 20 nm, track pitch 0.32 μm) was formed, on first dielectric layer 302, the resin was cured. Then, substrate was peeled. By these processes, optical separation layer 17 with thickness of 25 μm was formed, on which the guide groove leading laser beam 11 was formed at the side of first information layer 23.

After this, the following were laminated on this optical separation layer 17 by the sequential sputtering method: a $TiO_2$ layer (thickness: 20 nm) as adjustable transmittance layer 209, an Ag—Pd—Cu layer (thickness: 10 nm) as first reflective layer 208, fourth interface layer 205 (thickness: 10 nm), a $Ge_{28}Sn_3Bi_2Te_{34}$ layer (thickness: 6 nm) as first recording layer 204, as third interface layer 203 (thickness: 5 nm), and a $(ZnS)_{80}(SiO_2)_{20}$ layer (thickness: 40 nm) as third dielectric layer 202.

Finally, an ultra violet radiation-curable resin was applied over third dielectric layer 202, and after a uniform resin layer was formed by bonding polycarbonate (diameter 120 mm, thickness 65 μm) to third dielectric layer 202 and rotating, a 75 μm thick transparent layer 13 was formed by curing the resin with ultra violet radiation. Later, an initialization process was carried out in which second recording layer 304 and first recording layer 204 were crystallized with a laser beam. As mentioned above, a plurality of information recording media of different materials for third interface layer 203 and forth interface layer 205 were manufactured.

With the samples obtained in this manner, the recording sensitivity, the recording sensitivity, the repeat overwriting capability and the signal storage stability of first information layer 23 of information recording medium 24 were tested using the recording and reproducing apparatus 38 in FIG. 7. In this case, the wavelength of laser beam 11 was 405 nm, numerical aperture (NA) of objective lens 34 was 0.85, the sample linear speeds during measurement were 4.9 m/sec and 9.8 m/sec, and the shortest mark length (2T) was 0.149 μm. Additionally, information can be recorded on the groove.

Results are shown for the evaluation of materials of third interface layer 203 and fourth interface layer 205 of first information layer 23 of information recording medium 24, and the recording sensitivity, the repeat overwriting capability and signal storage stability of first information layer 23, in Table 13 for the linear speed of 4.9 m/sec (1×), in Table 14 for the linear speed of 9.8 m/sec (2×) and in Table 15 for the signal storage stability. Here, Zr—In—O in the Tables represent $(ZrO_2)_{50}(In_2O_3)_{50}$, Zr—Cr—O represent $(ZrO_2)_{50}(Cr_2O_3)_{50}$, respectively. Here, for the recording sensitivity at 1×, <12 mW is indicated by ◯, ≧12 mW and <13 mW is indicated by Δ, and ≧13 mW is indicated by x. Also, for the recording sensitivity at 2×, <13 mW is indicated by ◯, ≧13 mW and <14 mW is indicated by Δ, and ≧14 mW is indicated by x. For the repeat overwriting capability, a repeat overwriting cycle number of ≧3000 is indicated by θ, a ≧2000 but <3000 is indicated by ◯, a ≧500 but <2000 is indicated by Δ, and ≦500 is indicated by x. For the signal storage stability of recording marks recorded for 10, 100 and 1000 times, maximum values of the amount of archival deterioration at ≧0% and <2% is indicated by ◯, ≧2% and <3% is indicated by Δ, ≧3% is indicated by x.

TABLE 13

| Sample No. | Material of first interface layer 203 | Material of second interface layer 205 | recording sensitivity | repeat overwriting capability |
|---|---|---|---|---|
| 3-1 | Ge—N | Ge—N | Δ | X |
| 3-2 | Zr—Cr—O | Zr—Cr—O | Δ | θ |
| 3-3 | Zr—In—O | Zr—In—O | ◯ | Δ |
| 3-4 | Zr—In—O | Zr—Cr—O | ◯ | ◯ |
| 3-5 | Zr—Cr—O | Zr—In—O | ◯ | θ |

TABLE 14

| Sample No. | Material of first interface layer 203 | Material of second interface layer 205 | recording sensitivity | repeat overwriting capability |
|---|---|---|---|---|
| 3-1 | Ge—N | Ge—N | Δ | X |
| 3-2 | Zr—Cr—O | Zr—Cr—O | Δ | θ |
| 3-3 | Zr—In—O | Zr—In—O | ◯ | Δ |
| 3-4 | Zr—In—O | Zr—Cr—O | ◯ | ◯ |
| 3-5 | Zr—Cr—O | Zr—In—O | ◯ | θ |

TABLE 15

| Sample No. | Material of first interface layer 203 | Material of second interface layer 205 | signal storage stability |
|---|---|---|---|
| 3-2 | Zr—Cr—O | Zr—Cr—O | X |
| 3-3 | Zr—In—O | Zr—In—O | ◯ |
| 3-4 | Zr—In—O | Zr—Cr—O | ◯ |
| 3-5 | Zr—Cr—O | Zr—In—O | ◯ |

For these results, for Sample No. 3-1 used Ge—N for third interface layer 203 and forth interface layer 205, the recording sensitivity at 1× and 2× and the repeat overwriting capability at 1× were seen to be poor. For Sample No. 3-2 used for $(ZrO_2)_{50}(Cr_2O_3)_{50}$ for first interface layer 103 and second interface layer 105, the amount of archival deterioration is large and the signal storage stability was seen to be poor. For Sample No. 3-3, 3-4 and 3-5, the recording sensitivity, the repeat overwriting capability and the signal storage stability were favorable. Among these, particularly for Sample No. 3-5 used $(ZrO_2)_{50}(Cr_2O_3)_{50}$ for third interface layer 203 and used $(ZrO_2)_{50}(In_2O_3)_{50}$ for fourth interface layer 205, the recording sensitivity, the repeat overwriting capability and the signal storage stability were all highly favorable.

Also, for the structure of Sample No. 2-5, as a composition ratio of $ZrO_2$ and $Cr_2O_3$ in first interface layer 203 and a composition ratio of $ZrO_2$ and $In_2O_3$ in second interface layer 205 is changed, the recording sensitivity, the repeat overwriting capability and the signal storage stability for the linear speed of 1× and 2× were evaluated. Here, x3 is for $(ZrO_2)_{100-x3}(Cr_2O_3)_{x3}$ (provided that 0<x3<100), and y3 is for $(ZrO_2)_{100-y3}(In_2O_3)_{y3}$ (provided that 0<y3<100), and the values of x3 and y3 are changed. Results are shown in Table 16 for 1×, in Table 17 for 2× and in Table 18 for the signal storage stability.

TABLE 16

| Sample No. | material composition of first interface layer 203 (x3 value) | material composition of second interface layer 205 (y3 value) | recording sensitivity | repeat overwriting capability |
|---|---|---|---|---|
| 3-1 | Ge—N | Ge—N | Δ | X |
| 3-5 | 50 | 50 | ◯ | θ |
| 3-6 | 20 | 50 | ◯ | Δ |
| 3-7 | 35 | 50 | ◯ | θ |
| 3-8 | 65 | 50 | ◯ | θ |
| 3-9 | 80 | 50 | Δ | θ |
| 3-10 | 50 | 20 | Δ | θ |
| 3-11 | 50 | 35 | ◯ | θ |
| 3-12 | 50 | 65 | ◯ | θ |
| 3-13 | 50 | 80 | Δ | ◯ |

TABLE 17

| Sample No. | material composition of first interface layer 203 (x3 value) | material composition of second interface layer 205 (y3 value) | recording sensitivity | repeat overwriting capability |
|---|---|---|---|---|
| 3-1 | Ge—N | Ge—N | Δ | X |
| 3-5 | 50 | 50 | ◯ | θ |
| 3-6 | 20 | 50 | ◯ | Δ |
| 3-7 | 35 | 50 | ◯ | θ |
| 3-8 | 65 | 50 | ◯ | θ |
| 3-9 | 80 | 50 | Δ | θ |
| 3-10 | 50 | 20 | Δ | θ |
| 3-11 | 50 | 35 | ◯ | θ |
| 3-12 | 50 | 65 | ◯ | θ |
| 3-13 | 50 | 80 | Δ | ◯ |

TABLE 18

| Sample No. | material composition of first interface layer 203 (x3 value) | material composition of second interface layer 205 (y3 value) | signal storage stability |
|---|---|---|---|
| 3-5 | 50 | 50 | ◯ |
| 3-6 | 20 | 50 | ◯ |
| 3-7 | 35 | 50 | ◯ |
| 3-8 | 65 | 50 | ◯ |
| 3-9 | 80 | 50 | Δ |
| 3-10 | 50 | 20 | Δ |
| 3-11 | 50 | 35 | ◯ |
| 3-12 | 50 | 65 | ◯ |
| 3-13 | 50 | 80 | ◯ |

For these results, all Samples showed the favorable characteristics that exceed the results of Sample No. 1-1. Particularly, since Sample No. 3-5, 3-7, 3-8, 3-11, and 3-12 showed the more favorable characteristics, conditions of 20<x3<80 and 20<y3<80 are more preferable for the material composition of the interface layer.

Example 4

In Example 4, information recording medium 29 of FIG. 4 was constructed and the same experiment as Example 1 was carried out.

The samples were manufactured as described below. First, for substrate 26, polycarbonate substrates (diameter 120 mm, thickness 0.6 mm) were prepared and a guide groove (depth 40 nm, track pitch 0.615 µm) was formed for guiding laser beam 11. Next, the following were laminated on this polycarbonate substrate by the sequential sputtering method: a $(ZnS)_{80}(SiO_2)_{20}$ layer (thickness: 60 nm) as first dielectric layer 102, first interface layer 103 (thickness: 5 nm), a $Ge_{28}Sn_3Bi_2Te_{34}$ layer (thickness: 10 nm) as recording layer 104, second interface layer 105 (thickness: 5 nm), a $Dy_2O_3$ layer (thickness: 12 nm) as second dielectric layer 106, and an Ag—Pd—Cu layer (thickness: 80 nm) as reflective layer 108.

Then, an ultra violet radiation-curable resin was applied over dummy substrate 28, and after a uniform resin layer (thickness: 20 µm) was formed by bonding reflective layer 108 of substrate 26 to dummy substrate 28 and rotating, substrate 26 and dummy substrate 28 were adhered with adhesive layer 27 therebetween. Finally, an initialization process was carried out in which all surface of recording layer 104 was crystallized with a laser beam.

With the samples obtained in this manner, the recording sensitivity, the repeat overwriting capability and the signal storage stability of information layer 16 of information recording medium 29 were tested by the same method as Example 1. In this case, the wavelength of laser beam 11 was 660 nm, numerical aperture (NA) of objective lens 34 was 0.65, the sample linear speeds during measurement were 8.6 m/sec and 21.5 m/sec, and the shortest mark length was 0.42 µm. Additionally, the information was recorded on the groove and the land.

For these results, same as Example 1, when $(ZrO_2)_{50}(Cr_2O_3)_{50}$ or $(ZrO_2)_{50}(In_2O_3)_{50}$ was used for first interface layer 103 and second interface layer 105 in information layer 16, the recording sensitivity, the repeat overwriting capability and the signal storage stability were seen to be favorable. Among these, particularly when $(ZrO_2)_{50}(Cr_2O_3)_{50}$ was used for first interface layer 103 and $(ZrO_2)_{50}(In_2O_3)_{50}$ was used for second interface layer 105, information recording medium 29 having information layer 16 with all highly favorable recording sensitivity, repeat overwriting capability and signal storage stability were obtained.

Example 5

In Example 5, information recording medium 32 of FIG. 6 was constructed and the same experiment as Example 2 was carried out.

The samples were manufactured as described below.

First, as substrate 26, polycarbonate substrates (diameter 120 mm, thickness 0.6 mm) were prepared and a guide groove (depth 40 nm, track pitch 0.615 µm) was formed for guiding laser beam 11. Next, the following were laminated on this polycarbonate substrate by the sequential sputtering method: a $(ZnS)_{80}(SiO_2)_{20}$ layer (thickness: 40 nm) as third dielectric layer 202, a $(ZrO_2)_{25}(SiO_2)_{25}(Cr_2O_3)_{50}$ layer (thickness: 5 nm) as third interface layer 203, a $Ge_{28}Sn_3Bi_2Te_{34}$ layer (thickness: 6 nm) as first recording layer 204, a $(ZrO_2)_{25}(SiO_2)_{25}(In_2O_3)_{50}$ (thickness: 10 nm) as forth dielectric layer 205, an Ag—Pd—Cu layer (thickness: 10 nm) as first reflective layer 208, and a $TiO_2$ layer (thickness: 20 nm) as adjustable transmittance layer 209.

In addition, for substrate 30, polycarbonate substrates (diameter 120 mm, thickness 0.58 mm) were prepared and a guide groove (depth 40 nm, track pitch 0.58 µm) was formed for guiding laser beam 11. Next, the following were laminated on this polycarbonate substrate by the sequential sputtering method: an Ag—Pd—Cu layer (thickness: 80 nm) as second reflective layer 208, a $Dy_2O_3$ layer (thickness: 15 nm) as second dielectric layer 306, second interface layer 305 (thickness: 5 nm), a $Ge_{28}Sn_3Bi_2Te_{34}$ layer (thickness: 10 nm) as second recording layer 304, first interface layer 303 (thickness: 5 nm), and a $(ZnS)_{80}(SiO_2)_{20}$ layer (thickness: 60 nm) as first dielectric layer 302.

Then, an ultra violet radiation-curable resin was applied over first dielectric layer 302 of substrate 30, and after a uniform resin layer (thickness: 20 µm) was formed by bonding adjustable transmittance layer 209 of substrate 26 to substrate 30 and rotating, substrate 26 and substrate 30 were adhered with adhesive layer 27 there between by curing the resin with ultra violet radiation. Finally, an initialization process was carried out in which all surface of second recording layer 304 and first recording layer 104 was crystallized with a laser beam.

With the samples obtained in this manner, the recording sensitivity, the repeat overwriting capability and the signal storage stability of second information layer 25 of information recording medium 32 and were tested by the same method as Example 2. In this case, the wavelength of laser beam 11 was 660 nm, numerical aperture (NA) of objective lens 34 was 0.65, the sample linear speeds during measurement were 8.6 m/sec and 21.5 m/sec, and the shortest mark length was 0.42 µm. Additionally, the information was recorded on the groove and the land.

For these results, same as Example 2, when $(ZrO_2)_{50}(Cr_2O_3)_{50}$ or $(ZrO_2)_{50}(In_2O_3)_{50}$ was used for first interface layer 303 and second interface layer 305 in second information layer 25, the recording sensitivity, the repeat overwriting capability and the signal storage stability were seen to be favorable. Among these, particularly when $(ZrO_2)_{50}(Cr_2O_3)_{50}$ was used for first interface layer 303 and $(ZrO_2)_{50}(In_2O_3)_{50}$ was used for second interface layer 305, information recording medium 32 having second information layer 25 with all highly favorable recording sensitivity, repeat overwriting capability and signal storage stability were obtained.

Example 6

In Example 6, information recording medium 32 of FIG. 6 was constructed and the same experiment as Example 3 was carried out.

The samples were manufactured as described below. First, as substrate 26, polycarbonate substrates (diameter 120 mm, thickness 0.6 mm) were prepared and a guide groove (depth 40 nm, track pitch 0.615 µm) was formed for guiding laser beam 11. Next, the following were laminated on this polycarbonate substrate by the sequential sputtering method: a $(ZnS)_{80}(SiO_2)_{20}$ layer (thickness: 40 nm) as third dielectric layer 202, third interface layer 203 (thickness: 5 nm), a $Ge_{28}Sn_3Bi_2Te_{34}$ layer (thickness: 6 nm) as first recording layer 204, fourth interface layer 205 (thickness: 10 nm), an Ag—Pd—Cu layer (thickness: 10 nm) as first reflective layer 208, and a $TiO_2$ layer (thickness: 20 nm) as adjustable transmittance layer 209.

As substrate 30, polycarbonate substrates (diameter 120 mm, thickness 0.58 mm) were prepared and a guide groove (depth 40 nm, track pitch 0.615 μm) was formed for guiding laser beam 11. Next, the following were laminated on this polycarbonate substrate by the sequential sputtering method: an Ag—Pd—Cu layer (thickness: 80 nm) as second reflective layer 208, a $Dy_2O_3$ layer (thickness: 15 nm) as second dielectric layer 306, $(ZrO_2)_{25}(SiO_2)_{25}(In_2O_3)_{50}$ layer (thickness: 5 nm) as second interface layer 305, a $Ge_{28}Sn_3Bi_2Te_{34}$ layer (thickness: 10 nm) as second recording layer 304, a $(ZrO_2)_{25}(SiO_2)_{25}(Cr_2O_3)_{50}$ layer (thickness: 5 nm) as first interface layer 303, and a $(ZnS)_{80}(SiO_2)_{20}$ layer (thickness: 60 nm) as first dielectric layer 302.

Next, an ultra violet radiation-curable resin was applied over first dielectric layer 302 of substrate 30, and after a uniform resin layer (thickness: 20 nm) was formed by bonding adjustable transmittance layer 209 of substrate 26 to a substrate 30 and rotating, substrate 26 and substrate 30 are adhered with adhesive layer 27 therebetween. Finally, an initialization process was carried out in which all surface of second recording layer 304 and first recording layer 204 were crystallized with a laser beam.

With the samples obtained in this manner, the recording sensitivity, the repeat overwriting capability and signal storage stability of first information layer 23 of information recording medium 32 were tested by the same method as Example 3. In this case, the wavelength of laser beam 11 was 660 nm, numerical aperture (NA) of objective lens 34 was 0.65, the sample linear speeds during measurement were 8.6 m/sec and 21.5 m/sec, and the shortest mark length was 0.42 μm. Additionally, the information was recorded on the groove and the land.

For these results, same as Example 3, when $(ZrO_2)_{50}(Cr_2O_3)_{50}$ or $(ZrO_2)_{50}(In_2O_3)_{50}$ was used for third interface layer 203 and fourth interface layer 205 in second information layer 23, the recording sensitivity, the repeat overwriting capability and the signal storage stability were seen to be favorable. Particularly, when $(ZrO_2)_{50}(Cr_2O_3)_{50}$ is used for the third interface layer 203, $(ZrO_2)_{50}(In_2O_3)_{50}$ is used for the fourth interface layer 205, information recording medium 32 having second information layer 32 with all highly favorable recording sensitivity, repeat overwriting capability and signal storage stability were obtained.

Example 7

In Example 1 to 6, the same experiments were performed when second dielectric layer 106 and 306 were not placed, and the same results as in Example 1 to 6 were obtained. Particularly, when $(ZrO_2)_{50}(Cr_2O_3)_{50}$ was used for an interface layer (first interface layer 103, 303 and third interface layer 203) which is closer to the laser incident side than a recording layer, and $(ZrO_2)_{50}(In_2O_3)_{50}$ was used for an interface layer (second interface layer 105, 305 and fourth interface layer 205) which is closer to a reflective layer side than a recording layer, an information recording medium with all highly favorable recording sensitivity, repeat overwriting capability and signal storage stability were obtained. For these structures, the thickness of second interface layer 105 and 305 were 20 nm.

Example 8

Further to Example 1 to 6, the same experiments were performed when a Cr-containing layer was placed between an In-containing layer of an interface layer and a recording layer, and the same results as in Example 1 to 6 were obtained.

Example 9

Further to Example 1 to 6, the same experiments were performed when a C-containing layer that contains carbon was further placed either between an In-containing layer of an interface layer and a recording layer and/or between a Cr-containing layer and a recording layer, and the same results as in Example 1 to 6 were obtained.

Example 10

In Example 1 to 9, the same experiments were performed when an In-containing layer contains not only Zr, but at least one element selected from Zr, Hf, Ga, In, Y and Si, the same results as in Example 1 to 9 were obtained. Also, when the In-containing layer further contains Cr, the same results as in Example 1 to 9 were obtained.

Here, as one example, in Example 1, the recording sensitivity, the repeat overwriting capability and the signal storage stability for the linear speed of 1× and 2× were evaluated. $(ZrO_2)_{50}(Cr_2O_3)_{50}$ was used for first interface layer 103, and $(HfO_2)_{50}(In_2O_3)_{50}$ (referred to as Hf—In—O in the Table), $(Ga_2O_3)_{50}(In_2O_3)_{50}$ (referred to as Ga—In—O in the Table), $(Dy_2O_3)_{50}(In_2O_3)_{50}$ (referred to as Dy—In—O in the Table), $(Y_2O_3)_{50}(In_2O_3)_{50}$ (referred to as Y—In—O in the Table), $(SiO_2)_{50}(In_2O_3)_{50}$ (referred to as Si—In—O in the Table), $(ZrO_2)_{25}(SiO_2)_{25}(In_2O_3)_{50}$ (referred to as Zr—Si—In—O in the Table), $(ZrO_2)_{45}(Y_2O_3)_5(In_2O_3)_{50}$ (referred to as Zr—Y—In—O in the Table), $(Cr_2O_3)_{50}(In_2O_3)_{50}$ (referred to as Cr—In—O in the Table), $(ZrO_2)_{25}(Cr_2O_3)_{25}(In_2O_3)_{50}$ (referred to as Zr—Cr—In—O in the Table) and $(ZrO_2)_{20}(SiO_2)_{10}(Cr_2O_3)_{20}(In_2O_3)_{50}$ (referred to as Zr—Si—Cr—In—O in the Table) were used for second interface layer 105. Results are shown in Table 19 for 1×, in Table 20 for 2× and in Table 21 for the signal storage stability.

TABLE 19

| Sample No. | Material of first interface layer 103 | Material of second interface layer 105 | recording sensitivity | repeat overwriting capability |
|---|---|---|---|---|
| 4-1 | Zr—Cr—O | Hf—In—O | ○ | θ |
| 4-2 |  | Ga—In—O | ○ | ○ |
| 4-3 |  | Dy—In—O | ○ | ○ |
| 4-4 |  | Y—In—O | Δ | ○ |
| 4-5 |  | Si—In—O | ○ | ○ |
| 4-6 |  | Zr—Si—In—O | ○ | θ |
| 4-7 |  | Zr—Y—In—O | ○ | θ |
| 4-8 |  | Cr—In—O | Δ | θ |
| 4-9 |  | Zr—Cr—In—O | ○ | θ |
| 4-10 |  | Zr—Si—Cr—In—O | ○ | θ |

TABLE 20

| Sample No. | Material of first interface layer 103 | Material of second interface layer 105 | recording sensitivity | repeat overwriting capability |
|---|---|---|---|---|
| 4-1 | Zr—Cr—O | Hf—In—O | ○ | θ |
| 4-2 |  | Ga—In—O | ○ | ○ |
| 4-3 |  | Dy—In—O | ○ | ○ |
| 4-4 |  | Y—In—O | Δ | ○ |
| 4-5 |  | Si—In—O | ○ | ○ |
| 4-6 |  | Zr—Si—In—O | ○ | θ |
| 4-7 |  | Zr—Y—In—O | ○ | θ |
| 4-8 |  | Cr—In—O | Δ | θ |

TABLE 20-continued

| Sample No. | Material of first interface layer 103 | Material of second interface layer 105 | recording sensitivity | repeat overwriting capability |
|---|---|---|---|---|
| 4-9 | | Zr—Cr—In—O | ○ | θ |
| 4-10 | | Zr—Si—Cr—In—O | ○ | θ |

TABLE 21

| Sample No. | Material of first interface layer 103 | Material of second interface layer 105 | signal storage stability |
|---|---|---|---|
| 4-1 | Zr—Cr—O | Hf—In—O | ○ |
| 4-2 | | Ga—In—O | ○ |
| 4-3 | | Dy—In—O | ○ |
| 4-4 | | Y—In—O | ○ |
| 4-5 | | Si—In—O | Δ |
| 4-6 | | Zr—Si—In—O | ○ |
| 4-7 | | Zr—Y—In—O | ○ |
| 4-8 | | Cr—In—O | ○ |
| 4-9 | | Zr—Cr—In—O | ○ |
| 4-10 | | Zr—Si—Cr—In—O | ○ |

Example 11

In Example 1 to 10, the same experiments were performed when an Cr-containing layer contains not only Zr, but at least one element selected from Zr, Hf, Ga, In, Y and Si, the same results as in Example 1 to 10 were obtained. Here, $(HfO_2)_{50}(Cr_2O_3)_{50}$ (referred to as Hf—Cr—O in the Table), $(Ga_2O_3)_{50}(Cr_2O_3)_{50}$ (referred to as Ga—Cr—O in the Table), $(In_2O_3)_{50}(Cr_2O_3)_{50}$ (referred to as In—Cr—O in the Table), $(Y_2O_3)_{50}(Cr_2O_3)_{50}$ (referred to as Y—Cr—O in the Table), $(SiO_2)_{50}(Cr_2O_3)_{50}$ (referred to as Si—Cr—O in the Table), $(ZrO_2)_{25}(SiO_2)_{25}(Cr_2O_3)_{50}$ (referred to as Zr—Si—Cr—O in the Table), $(ZrO_2)_{45}(Y_2O_3)_5(Cr_2O_3)_{50}$ (referred to as Zr—Y—Cr—O in the Table), $(ZrO_2)_{25}(In_2O_3)_{25}(Cr_2O_3)_{50}$ (referred to as Zr—In—Cr—O in the Table) and $(ZrO_2)_{20}(SiO_2)_{10}(In_2O_3)_{20}(Cr_2O_3)_{50}$ (referred to as Zr—Si—In—Cr—O in the Table) were used for first interface layer 103. Also, $(ZrO_2)_{50}(In_2O_3)_{50}$ was used for second interface layer 105, and the recording sensitivity, the repeat overwriting capability and the signal storage stability for the linear speed of 1× and 2× were evaluated. Results are shown in Table 22 for 1×, in Table 23 for 2× and in Table 24 for the signal storage stability.

TABLE 22

| Sample No. | Material of first interface layer 103 | Material of second interface layer 105 | recording sensitivity | repeat overwriting capability |
|---|---|---|---|---|
| 5-1 | Hf—Cr—O | Zr—In—O | ○ | θ |
| 5-2 | Ga—Cr—O | | ○ | ○ |
| 5-3 | In—Cr—O | | ○ | ○ |
| 5-4 | Y—Cr—O | | Δ | ○ |
| 5-5 | Si—Cr—O | | ○ | ○ |
| 5-6 | Zr—Si—Cr—O | | ○ | θ |
| 5-7 | Zr—Y—Cr—O | | ○ | θ |
| 5-8 | Zr—In—Cr—O | | ○ | θ |
| 5-9 | Zr—Si—In—Cr—O | | ○ | θ |

TABLE 23

| Sample No. | Material of first interface layer 103 | Material of second interface layer 105 | recording sensitivity | repeat overwriting capability |
|---|---|---|---|---|
| 5-1 | Hf—Cr—O | Zr—In—O | ○ | θ |
| 5-2 | Ga—Cr—O | | ○ | ○ |
| 5-3 | In—Cr—O | | ○ | ○ |
| 5-4 | Y—Cr—O | | Δ | ○ |
| 5-5 | Si—Cr—O | | ○ | ○ |
| 5-6 | Zr—Si—Cr—O | | ○ | θ |
| 5-7 | Zr—Y—Cr—O | | ○ | θ |
| 5-8 | Zr—In—Cr—O | | ○ | θ |
| 5-9 | Zr—Si—In—Cr—O | | ○ | θ |

TABLE 24

| Sample No. | Material of first interface layer 103 | Material of second interface layer 105 | signal storage stability |
|---|---|---|---|
| 5-1 | Hf—Cr—O | Zr—In—O | ○ |
| 5-2 | Ga—Cr—O | | ○ |
| 5-3 | In—Cr—O | | ○ |
| 5-4 | Y—Cr—O | | ○ |
| 5-5 | Si—Cr—O | | Δ |
| 5-6 | Zr—Si—Cr—O | | ○ |
| 5-7 | Zr—Y—Cr—O | | ○ |
| 5-8 | Zr—In—Cr—O | | ○ |
| 5-9 | Zr—Si—In—Cr—O | | ○ |

Example 12

In Example 12, electrical information recording medium 44 of FIG. 8 was manufactured, and the phase-change due to application of an electrical current was observed.

A silicon substrate with a nitride-treated surface was prepared as substrate 39, on which was laminated by the sequential sputtering method: Pt (surface area: 6 μm×6 μm; thickness: 0.1 μm), used for lower electrode 40; $(ZrO_2)_{25}(SiO_2)_{25}(Cr_2O_3)_{50}$ (surface area: 4.5 μm×5 μm; thickness: 0.01 μm), used for first interface layer 401; $Ge_{22}Bi_2Te_{25}$ (surface area: 5 μm×5 μm; thickness: 0.1 μm), used for first recording layer 41; $(ZrO_2)_{25}(SiO_2)_{25}(In_2O_3)_{50}$ (surface area: 4.5 μm×5 μm; thickness: 0.01 μm), used for second interface layer 402; $(ZrO_2)_{25}(SiO_2)_{25}(Cr_2O_3)_{50}$ (surface area: 4.5 μm×5 μm; thickness: 0.01 μm), used for third interface layer 403; $Sb_{70}Te_{25}Ge_5$ (surface area: 5 μm×5 μm; thickness: 0.1 μm), used for second recording layer 42; $(ZrO_2)_{25}(SiO_2)_{25}(Cr_2O_3)_{50}$ (surface area: 4.5 μm×5 μm; thickness: 0.01 μm), used for fourth interface layer 404; and, Pt (surface area: 5 μm×5 μm; thickness: 0.1 μm), used for upper electrode 43. First interface layer 401, second interface layer 402, third interface layer 403 and, fourth interface layer 404 were insulators. Consequently, in order for electric current to flow in first recording layer 41 and second recording layer 42, the films of first interface layer 401, second interface layer 402, third interface layer 403 and, fourth interface layer 404 had to be formed with a smaller surface area than that of first recording layer 41 and second recording layer 42, and these interface layers contacted with lower electrode 40, first recording layer 41, second recording layer 42 and upper electrode 43, respectively.

Then, lower electrode 40 and upper electrode 43 were bonded to Au lead lines, and electrical information recording medium 44 was connected to electrical information recording and reproducing apparatus 50 through application unit 45. From this electrical information recording and reproducing apparatus 50, pulse electrical source 48 was connected between lower electrode 40 and upper electrode 43 by means of switch 47, and furthermore the changes in resistance value due to the phase-changes in first recording layer 41 and second recording layer 42 could be detected by means of resistance meter 46 connected via switch 49 between lower electrode 40 and upper electrode 43.

Here, the melting point $T_{m1}$ of first recording layer 41 was 630° C., the crystallization temperature $T_{x1}$ was 170° C. and the crystallization time $t_{x1}$ was 100 ns. In addition, the melting point $T_{m2}$ of second recording layer 42 was 550° C., the crystallization temperature $T_{x2}$ was 200° C. and the crystallization time $t_{x2}$ was 50 ns. Moreover, the resistance $r_{a1}$ of the amorphous phase from first recording layer 41 was 500Ω, the resistance $r_{c1}$ for the crystalline phase was 10ω, resistance $r_{a2}$ of the amorphous phase from second recording layer 42 was 500ω, and the resistance $r_{c2}$ for the crystalline phase was 20ω.

If first recording layer 41 and second recording layer 42 are both in the amorphous phase (status 1), and electrical current pulse of $I_{c1}$=5 mA, $t_{c1}$=150 ns in the waveform 501 shown in FIG. 11 was applied between lower electrode 40 and upper electrode 43, only first recording layer 41 would undergo the transition from amorphous to crystalline (referred to below as Status 2). Additionally, in Status 1, when an electrical current pulse of $I_{c2}$=10 mA and $t_{c2}$=100 ns in recording waveform 502 shown in FIG. 11 was applied between lower electrode 40 and upper electrode 43, only second recording layer 42 would undergo the transition from amorphous to crystalline (referred to below as Status 3). Additionally, in Status 1, when an electrical current pulse of $I_{c2}$=10 mA and $t_{c1}$=150 ns in recording waveform 503 shown in FIG. 11 was applied between lower electrode 40 and upper electrode 43, both first recording layer 41 and second recording layer 42 would undergo the transition from amorphous to crystalline (referred to below as Status 4).

Next, in the low resistance state (Status 4) where both first recording layer 41 and second recording layer 42 were in the crystalline phase, when an electrical current pulse of $I_{a1}$=20 mA, $I_{c2}$=10 mA and $t_{c2}$=100 ns was applied between lower electrode 40 and upper electrode 43, only first recording layer 41 would undergo the transition from crystalline to amorphous (Status 3). Moreover, in Status 4, when an electrical current pulse of $I_{a2}$=15 mA and $t_{a2}$=50 ns in recording waveform 505 shown in FIG. 11 was applied between lower electrode 40 and upper electrode 43, only second recording layer 42 would undergo the transition from crystalline to amorphous (Status 2). Additionally, in Status 4, when an electrical current pulse of $I_{a1}$=20 mA, $t_{a1}$=50 ns in erasing waveform 506 shown in FIG. 11 was applied between lower electrode 40 and upper electrode 43, both first recording layer 41 and second recording layer 42 would undergo the transition from crystalline to amorphous (Status 1).

Furthermore, in either Status 2 or Status 3, when an electrical current pulse of $I_{c2}$=10 mA and $t_{c1}$=150 ns in recording waveform 503 shown in FIG. 11 was applied, both first recording layer 41 and second recording layer 42 would undergo the transition from amorphous to crystalline (Status 4). In addition, in either Status 2 or Status 3, when an electrical current pulse of $I_{a1}$=20 mA, $I_{c2}$=10 mA, $t_{c1}$=150 ns and $t_{a1}$=50 ns in erasing waveform 507 shown in FIG. 11 was applied, both first recording layer 41 and second recording layer 42 would undergo the transition from crystalline to amorphous (Status 1). Moreover, in Status 2, when an electrical current pulse of $I_{a1}$=20 mA, $I_{c2}$=10 mA, $t_{c2}$=100 ns and $t_{a1}$=50 ns in recording waveform 508 shown in FIG. 11 was applied, first recording layer 41 would undergo a transition from crystalline to amorphous and second recording layer 42 would undergo a transition from amorphous to crystalline (Status 3). In addition, in Status 3, when an electrical current pulse of $I_{a2}$=15 mA, $I_{c1}$=5 mA, $t_{c1}$=150 ns and $t_{a2}$=50 ns in recording waveform 509 shown in FIG. 11 was applied, first recording layer 41 would undergo a transition from amorphous to crystalline and second recording layer 42 would undergo a transition from crystalline to amorphous (Status 2).

From the above results, in electrical phase-change information recording medium 44 of FIG. 8, first recording layer 41 and second recording layer 42 undergo electrical, reversible changes between the respective crystalline and amorphous phases, and it is known to be possible to realize four types of status (Status 1: first recording layer 41 and second recording layer 42 are both in the amorphous phase; Status 2: first recording layer 41 is in the crystalline phase and second recording layer 42 is in the amorphous phase; Status 3: first recording layer 41 is in the amorphous phase and second recording layer 42 is in the crystalline phase; Status 4: first recording layer 41 and second recording layer 42 are both in the crystalline phase).

Additionally, when the repeat overwrite capability electrical phase-change information recording medium 44 of is measured, with first interface layer 401, second interface layer 402, third interface layer 403 and fourth interface layer 404, it is known that there can be an approximately $\geq$10-fold increase compared to the case where the dielectric layers are absent. This is because first interface layer 401, second interface layer 402, third interface layer 403 and fourth interface layer 404 act to suppress mass transfer from lower electrode 40 and from upper electrode 43 to first recording layer 41 and to second recording layer 42.

According to the present invention, regardless of the number of information layers, an optical information recording medium with improved transmittance and signal strength of the information layers can be offered.

Embodiments of the present invention are described with the examples, however, the present invention is not limited to the above mentioned Embodiments and can be applied to other Embodiments based on the technical ideas of the present invention

INDUSTRIAL APPLICABILITY

According to the information recording media of the present invention, since the recording sensitivity and the signal storage stability of the information layer can be improved, the media possess qualities for the long-term storage of data (non-volatile), and are useful for high-density overwritable-type or one write-type optical disks and the like. This invention is also suitable for application to non-volatile electrical memory.

The invention claimed is:
1. An information recording medium comprising:
one or more information layers that include a phase-change recording layer, the recording layer including a surface with a first side and a second side,
wherein at least one of the information layers includes a Cr-containing layer containing Cr and O that contact the first side of the surface of the recording layer, and an In-containing layer containing In and O that contact the second side of the surface of the recording layer,
wherein both the Cr-containing layer and the In-containing layer are Sn-free, and
wherein one of the Cr-containing layer and the In-containing layer is in contact with a ZnS-free dielectric layer.

2. The information recording medium according to claim 1, comprising two or more said information layers that include the phase-change recording layer.

3. The information recording medium according to claim 1,
wherein the information layer includes a first interface layer, the recording layer, and a second interface layer in this order from a laser beam incident side, and
the first interface layer is the Cr-containing layer, and the second interface layer is the In-containing layer.

4. The information recording medium according to claim 3,
wherein the information layer further includes a reflective layer, a second dielectric layer, and a first dielectric layer,
the information layer includes the first dielectric layer, the first interface layer, the recording layer, the second interface layer, the second dielectric layer, and the reflective layer in this order from the laser beam incident side, and
wherein the second dielectric layer is the ZnS-free dielectric layer.

5. The information recording medium according to claim 2,
wherein the two or more said information layers includes a first information layer proximal to a laser beam incident side of the information layers which includes a third dielectric layer, a third interface layer, the recording layer, a fourth interface layer, a reflective layer, and an adjustable transmittance layer in this order from the laser beam incident side, and
the third interface layer is the Cr-containing layer, and the fourth interface layer is the In-containing layer.

6. The information recording medium according to claim 1,
wherein the information layer includes a first interface layer, the recording layer, and a second interface layer in this order from a laser beam incident side, and
the first interface layer is the In-containing layer, and the second interface layer is the Cr-containing layer.

7. The information recording medium according to claim 6,
wherein the information layer further includes a reflective layer, a second dielectric layer, and a first dielectric layer, and
the information layer includes the first dielectric layer, the first interface layer, the recording layer, the second interface layer, the second dielectric layer, and the reflective layer in this order from the laser beam incident side.

8. The information recording medium according to claim 2,
wherein the two or more said information layers includes a first information layer proximal to the laser beam incident side of the information layers includes a third dielectric layer, a third interface layer, the recording layer, a fourth interface layer, a reflective layer, and an adjustable transmittance layer in this order from a laser beam incident side, and
the third interface layer is the In-containing layer, and the fourth interface layer is the Cr-containing layer.

9. An information recording medium comprising:
one or more information layers that include a phase-change recording layer, the recording layer including a first side and a second side,
wherein at least one of the information layers includes two In-containing layers containing In and O, a first In-containing layer of the two In-containing layers being in contact with the first side of the recording layer while a second In-containing layer of the two In-containing layers being in contact with the second side of the recording layer,
wherein the two In-containing layers are Sn-free, and
wherein one of the first and second In-containing layers is in contact with a ZnS-free dielectric layer.

10. The information recording medium according to claim 9, comprising two or more said information layers that include the phase-change recording layer.

11. The information recording medium according to claim 9,
wherein the information layer includes a first dielectric layer, a first interface layer, the recording layer, a second interface layer, a second dielectric layer, and a reflective layer in this order from a laser beam incident side,
the first interface layer and the second interface layer are the first and second In-containing layers, and
wherein the second dielectric layer is the ZnS-free dielectric layer.

12. The information recording medium according to claim 10,
wherein the two or more said information layers includes a first information layer proximal to the laser beam incident side of the information layers includes a third dielectric layer, a third interface layer, the recording layer, a fourth interface layer, a reflective layer, and an adjustable transmittance layer in this order from the laser beam incident side, and
the third interface layer and the fourth interface layer are the first and second In-containing layers.

13. The information recording medium according to claim 1, wherein the Cr-containing layer comprises Cr, O, and at least one element selected from Zr, Hf, Ga, In, Y and Si.

14. The information recording medium according to claim 13, wherein the Cr-containing layer comprises $Cr_2O_3$, and at least one oxide selected from $ZrO_2$, $HfO_2$, $Ga_2O_3$, $In_2O_3$, $Y_2O_3$ and $SiO_2$.

15. The information recording medium according to claim 1, wherein the In-containing layer comprises In, O, and at least one element selected from Zr, Hf, Ga, In, Y and Si.

16. The information recording medium according to claim 15, wherein the In-containing layer comprises $In_2O_3$, and at least one oxide selected from $ZrO_2$, $HfO_2$, $Ga_2O_3$, $Y_2O_3$, $Dy_2O_3$ and $SiO_2$.

17. The information recording medium according to claim 15, wherein the In-containing layer further comprises Cr.

18. The information recording medium according to claim 17, wherein the In-containing layer further comprises $Cr_2O_3$.

19. A method for manufacturing an information recording medium comprising a phase-change recording layer, comprising:
forming an interface layer using an In-containing sputtering target that includes In and O;
forming the recording layer;
forming an interface layer using a Cr-containing sputtering target that includes Cr and O; and
forming a ZnS-free dielectric layer using a sputtering target free of ZnS,
wherein the ZnS-free dielectric layer is formed in contact with one of the interface layers, and
wherein both of interface layers are Sn-free.

20. The method for manufacturing an information recording medium according to claim 19,
wherein the Cr-containing sputtering target includes Cr, O, and at least one element selected from Zr, Hf, Ga, In, Y and Si.

21. The method for manufacturing an information recording medium according to claim 19,
wherein the In-containing sputtering target includes In, O, and at least one element selected from Zr, Hf, Ga, In, Y and Si.

22. The method for manufacturing an information recording medium according to claim 21, wherein the In-containing sputtering target further includes Cr.

23. The information recording medium according to claim 9, wherein the In-containing layer comprises In, O, and at least one element selected from Zr, Hf, Ga, In, Y and Si.

* * * * *